United States Patent
Zhou et al.

(10) Patent No.: US 12,532,280 B2
(45) Date of Patent: Jan. 20, 2026

(54) UPLINK SYNCHRONIZATION REFINEMENT FOR INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

(21) Appl. No.: 17/866,360

(22) Filed: Jul. 15, 2022

(65) Prior Publication Data

US 2024/0023044 A1    Jan. 18, 2024

(51) Int. Cl.
*H04W 56/00*     (2009.01)
*H04L 5/00*     (2006.01)

(52) U.S. Cl.
CPC ....... *H04W 56/0045* (2013.01); *H04L 5/0051* (2013.01); *H04W 56/001* (2013.01)

(58) Field of Classification Search
None
See application file for complete search history.

(56) References Cited

U.S. PATENT DOCUMENTS

2009/0239476 A1*  9/2009  Womack .............. H04W 72/21
                                                    455/68
2013/0100938 A1*  4/2013  Kwon ................. H04L 27/2655
                                                    370/336

(Continued)

FOREIGN PATENT DOCUMENTS

WO    WO-2022031207 A1    2/2022

OTHER PUBLICATIONS

Futurewei: "Further Discussion on Scell Dormancy", 3GPP TSG-RAN WG2 Meeting #109e-bis, R2-2002750, 3rd Generation Partnership Project, Mobile Competence Centre, 650, Route Des Lucioles, F-06921 Sophia-Antipolis Cedex, France, vol. RAN WG2, No. E-Conference, Apr. 20, 2020-Apr. 30, 2020, Apr. 10, 2020, 3 Pages, XP052353740, Section 2.

(Continued)

*Primary Examiner* — Ayman A Abaza
*Assistant Examiner* — Camquyen Thai
(74) *Attorney, Agent, or Firm* — Holland & Hart LLP/Qualcomm Incorporated

(57) ABSTRACT

Methods, systems, and devices for wireless communications are described. The network may configure a set of cells including one or more active cells and one or more deactivated cell for a user equipment (UE). The network may indicate a triggering condition and communication resources for the UE to transmit a sounding reference signal (SRS) to the deactivated cell. Based on identifying that the triggering condition has been satisfied, the UE may transmit the SRS to the deactivated cell using the indicated communication resource. The network may decode the SRS and identify updated timing advance information. The network may indicate the updated timing advance information to the UE, and accordingly, when the deactivated cell is activated, the UE may have updated timing advance information to apply to uplink transmissions to the newly activated (previously deactivated) cell.

30 Claims, 17 Drawing Sheets

(56) References Cited

U.S. PATENT DOCUMENTS

| | | | | |
|---|---|---|---|---|
| 2013/0176953 | A1* | 7/2013 | Stern-Berkowitz | ............................ H04W 52/365 370/329 |
| 2013/0272235 | A1* | 10/2013 | Tseng | .................... H04W 72/23 370/329 |
| 2013/0343358 | A1* | 12/2013 | Kato | ................. H04W 52/0212 370/336 |
| 2014/0016593 | A1* | 1/2014 | Park | .................... H04W 74/004 370/329 |
| 2014/0016623 | A1* | 1/2014 | Bai | ................... H04W 56/0045 370/336 |
| 2014/0023055 | A1* | 1/2014 | Jeong | ....................... H04L 5/001 370/336 |
| 2022/0022067 | A1 | 1/2022 | Kim et al. | |
| 2022/0046646 | A1 | 2/2022 | Xu et al. | |
| 2023/0413333 | A1* | 12/2023 | Tsuboi | ................... H04W 76/15 |
| 2024/0056825 | A1* | 2/2024 | Zhang | ................... H04B 7/0628 |

OTHER PUBLICATIONS

Huawei, et al., "Discussion on the reply LS for SCell dormancy", 3GPP TSG RAN WG 1 Meeting #100bis-e, R1-2002680, 3rd Generation Partnership Project, Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020, 6 Pages, XP051875763, Section 2 Section 3.
International Search Report and Written Opinion—PCT/US2023/068504—ISA/EPO—Oct. 4, 2023.

* cited by examiner

UPLINK SYNCHRONIZATION REFINEMENT FOR INTER-CELL MOBILITY

FIELD OF TECHNOLOGY

The following relates to wireless communications, including uplink synchronization refinement for inter-cell mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink synchronization refinement for inter-cell mobility. For example, the described techniques provide for refining timing advances for uplink transmissions for a user equipment (UE) via transmission by the UE of one or more sounding reference signals (SRSs) to one or more deactivated cell(s). The network may decode SRS(s) transmitted by a UE to a deactivated cell to identify updated timing advance information for uplink transmission(s) by the UE to the deactivated cell. For example, the network may configure a set of cells including one or more active cells and one or more deactivated cells. The network may indicate a triggering condition and communication resources for the UE to transmit an SRS to a deactivated cell of the one or more deactivated cells. Based on identifying that the triggering condition has been satisfied, the UE may transmit the SRS to the deactivated cell using the indicated communication resource. The network may decode the SRS and identify updated timing advance information. The network may indicate the updated timing advance information to the UE, and accordingly, when the deactivated cell is activated, the UE may have updated timing advance information to apply to uplink transmissions to the newly activated (previously deactivated) cell.

A method for wireless communications at a UE is described. The method may include receiving, from a network entity, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, transmitting the SRS to the deactivated cell using the communication resource associated with the deactivated cell based on identifying that the triggering condition associated with the deactivated cell has been satisfied, and receiving, from the network entity and in response to the SRS, second control signaling indicating a timing advance associated with an uplink transmission to the deactivated cell.

An apparatus for wireless communication is described. The apparatus may include a memory, a transceiver, and at least one processor of a UE, the at least one processor coupled with the memory and the transceiver. The at least one processor may be configured to receive, from a network entity, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, transmit the SRS to the deactivated cell using the communication resource associated with the deactivated cell based on identifying that the triggering condition associated with the deactivated cell has been satisfied, and receive, from the network entity and in response to the SRS, second control signaling indicating a timing advance associated with an uplink transmission to the deactivated cell.

Another apparatus for wireless communications at a UE is described. The apparatus may include means for receiving, from a network entity, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, means for transmitting the SRS to the deactivated cell using the communication resource associated with the deactivated cell based on identifying that the triggering condition associated with the deactivated cell has been satisfied, and means for receiving, from the network entity and in response to the SRS, second control signaling indicating a timing advance associated with an uplink transmission to the deactivated cell.

A non-transitory computer-readable medium storing code for wireless communications at a UE is described. The code may include instructions executable by a processor to receive, from a network entity, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, transmit the SRS to the deactivated cell using the communication resource associated with the deactivated cell based on identifying that the triggering condition associated with the deactivated cell has been satisfied, and receive, from the network entity and in response to the SRS, second control signaling indicating a timing advance associated with an uplink transmission to the deactivated cell.

In some examples of the method, apparatuses, and non-transitory computer-readable medium described herein, receiving the first control signaling may include operations, features, means, or instructions for receiving an indication of a periodicity associated with the transmission of the SRS, where the triggering condition corresponds to a transmission occasion associated with the periodicity.

Some examples of the method, apparatuses, and non-transitory computer-readable medium described herein may further include operations, features, means, or instructions for receiving, from the network entity, third control signaling activating the deactivated cell and transmitting, to the deactivated cell in response to the third control signaling, the uplink transmission in accordance with the timing advance.

Some examples of the method, apparatuses, and non-transitory computer-readable medium described herein may further include operations, features, means, or instructions for receiving, from the network entity, third control signaling activating a second deactivated cell of the set of cells, the second deactivated cell associated with a same timing advance group as the deactivated cell and transmitting, to the second deactivated cell in response to the third control signaling, the uplink transmission in accordance with the timing advance.

Some examples of the method, apparatuses, and non-transitory computer-readable medium described herein may further include operations, features, means, or instructions for receiving, from the network entity, third control signaling indicating to transmit the SRS, where the triggering condition includes reception of the third control signaling.

In some examples of the method, apparatuses, and non-transitory computer-readable medium described herein, receiving the third control signaling may include operations, features, means, or instructions for receiving an indication of a cell activation command for the deactivated cell.

Some examples of the method, apparatuses, and non-transitory computer-readable medium described herein may further include operations, features, means, or instructions for transmitting, to the deactivated cell, the uplink transmission in accordance with the timing advance.

In some examples of the method, apparatuses, and non-transitory computer-readable medium described herein, receiving the third control signaling may include operations, features, means, or instructions for receiving an indication of a second timing advance to apply to transmission of the SRS.

Some examples of the method, apparatuses, and non-transitory computer-readable medium described herein may further include operations, features, means, or instructions for receiving, from the deactivated cell, a first downlink signal, receiving, from a reference cell of the set of cells, a second downlink signal, and identifying a timing difference between reception of the first downlink signal and the second downlink signal, where the triggering condition includes a timing difference change between the timing difference and a prior timing difference exceeding a threshold.

Some examples of the method, apparatuses, and non-transitory computer-readable medium described herein may further include operations, features, means, or instructions for transmitting a set of multiple SRSs to the deactivated cell via a set of multiple communication resources, the set of multiple SRSs including the SRS and the set of multiple communication resources including the communication resource.

In some examples of the method, apparatuses, and non-transitory computer-readable medium described herein, receiving the second control signaling may include operations, features, means, or instructions for receiving the second control signaling via one of a medium access control (MAC) control element (CE) or a downlink control information (DCI) message.

In some examples of the method, apparatuses, and non-transitory computer-readable medium described herein, receiving the first control signaling may include operations, features, means, or instructions for receiving the first control signaling via one of a medium access control (MAC) control element or a DCI message, the first control signaling superseding a prior indication of the set of cells.

Some examples of the method, apparatuses, and non-transitory computer-readable medium described herein may further include operations, features, means, or instructions for receiving, from the network entity, third control signaling indicating a set of multiple communication resources including the communication resource, where receiving the first control signaling includes receiving one of a MAC-CE or a DCI message indicating the communication resource of the set of multiple communication resources.

A method for wireless communications at a network entity is described. The method may include transmitting, to a UE, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, receiving, from the UE, the SRS via the deactivated cell, and transmitting, to the UE based and in response to the SRS, second control signaling indicating a timing advance associated with an uplink transmission to the deactivated cell.

An apparatus for wireless communication is described. The apparatus may include a memory and at least one processor of a network entity, the at least one processor coupled with the memory and the transceiver. The at least one processor may be configured to transmit, to a UE, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, receive, from the UE, the SRS via the deactivated cell, and transmit, to the UE based and in response to the SRS, second control signaling indicating a timing advance associated with an uplink transmission to the deactivated cell.

Another apparatus for wireless communications at a network entity is described. The apparatus may include means for transmitting, to a UE, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, means for receiving, from the UE, the SRS via the deactivated cell, and means for transmitting, to the UE based and in response to the SRS, second control signaling indicating a timing advance associated with an uplink transmission to the deactivated cell.

A non-transitory computer-readable medium storing code for wireless communications at a network entity is described. The code may include instructions executable by a processor to transmit, to a UE, first control signaling indicating a set of cells including one or more activated cells and one or more deactivated cells, the first control signaling further indicating both a triggering condition associated with transmission of a SRS and a communication resource for the transmission of the SRS, where the transmission of the SRS is associated with a timing advance update for one or more uplink transmissions to a deactivated cell of the one or more deactivated cells, receive, from the UE, the SRS via the deactivated cell, and transmit, to the UE based and in response to the SRS, second control signaling indicating a timing advance associated with an uplink transmission to the deactivated cell.

In some examples of the method, apparatuses, and non-transitory computer-readable medium described herein, transmitting the first control signaling may include operations, features, means, or instructions for transmitting an indication of a periodicity associated with the transmission of the SRS, where the triggering condition corresponds to a transmission occasion associated with the periodicity.

Some examples of the method, apparatuses, and non-transitory computer-readable medium described herein may further include operations, features, means, or instructions for transmitting, to the UE, third control signaling activating the deactivated cell and receiving, from the UE via the deactivated cell and in response to the third control signaling, the uplink transmission in accordance with the timing advance.

Some examples of the method, apparatuses, and non-transitory computer-readable medium described herein may further include operations, features, means, or instructions for transmitting, to the UE, third control signaling activating a second deactivated cell of the set of cells, the second deactivated cell associated with a same timing advance group as the deactivated cell and receiving, from the UE via the second deactivated cell and in response to the third control signaling, the uplink transmission in accordance with the timing advance.

Some examples of the method, apparatuses, and non-transitory computer-readable medium described herein may further include operations, features, means, or instructions for transmitting, to the UE, third control signaling indicating to transmit the SRS, where the triggering condition includes reception of the third control signaling.

In some examples of the method, apparatuses, and non-transitory computer-readable medium described herein, transmitting the third control signaling may include operations, features, means, or instructions for transmitting an indication of a cell activation command for the deactivated cell.

Some examples of the method, apparatuses, and non-transitory computer-readable medium described herein may further include operations, features, means, or instructions for receiving, from the UE via the deactivated cell, the uplink transmission in accordance with the timing advance.

In some examples of the method, apparatuses, and non-transitory computer-readable medium described herein, transmitting the third control signaling may include operations, features, means, or instructions for transmitting an indication of a second timing advance to apply to transmission of the SRS.

Some examples of the method, apparatuses, and non-transitory computer-readable medium described herein may further include operations, features, means, or instructions for transmitting, to the UE via the deactivated cell, a first downlink signal and transmitting, to the UE via a reference cell of the set of cells, a second downlink signal, where the triggering condition includes a timing difference change between a timing difference between a reception of the first downlink signal at the UE and a reception of the second downlink signal at the UE and a prior timing difference exceeding a threshold.

Some examples of the method, apparatuses, and non-transitory computer-readable medium described herein may further include operations, features, means, or instructions for receiving, from the UE via the deactivated cell, a set of multiple SRSs via a set of multiple communication resources, the set of multiple SRSs including the SRS and the set of multiple communication resources including the communication resource.

In some examples of the method, apparatuses, and non-transitory computer-readable medium described herein, transmitting the second control signaling may include operations, features, means, or instructions for transmitting the second control signaling via one of a MAC-CE or a DCI message.

In some examples of the method, apparatuses, and non-transitory computer-readable medium described herein, transmitting the first control signaling may include operations, features, means, or instructions for transmitting the first control signaling via one of a MAC-CE or a DCI message, the first control signaling superseding a prior indication of the set of cells.

Some examples of the method, apparatuses, and non-transitory computer-readable medium described herein may further include operations, features, means, or instructions for transmitting, to the UE, third control signaling indicating a set of multiple communication resources including the communication resource, where transmitting the first control signaling includes transmitting one of a MAC-CE or a DCI message indicating the communication resource of the set of multiple communication resources.

DETAILED DESCRIPTION

Figure 1:
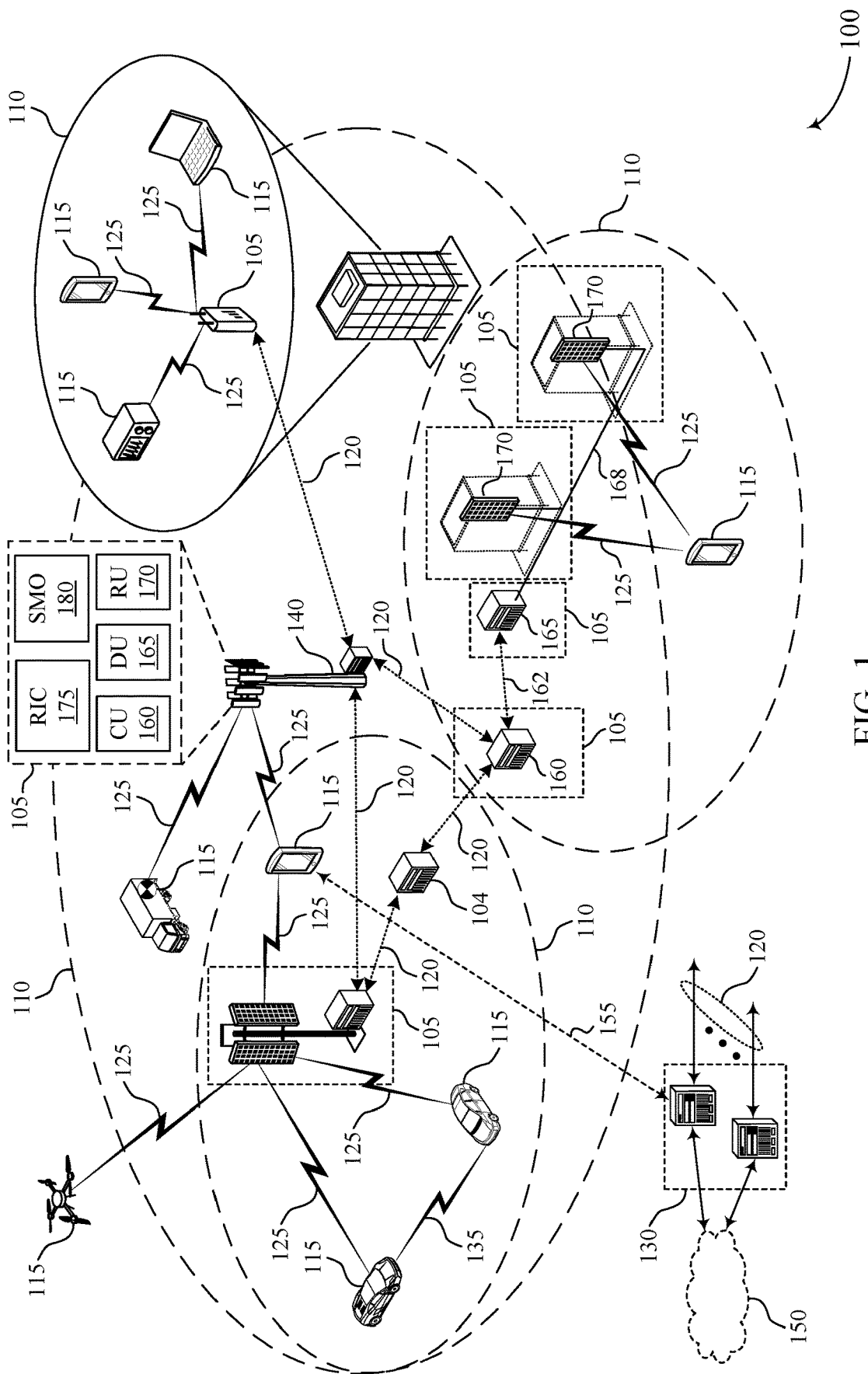
FIG. 1 illustrates an example of a wireless communications system that supports uplink synchronization refinement for inter-cell mobility in accordance with one or more aspects of the present disclosure.

In wireless communications systems, the network may indicate to a user equipment (UE) (e.g., via radio resource control (RRC) signaling) a set of cells for layer 1 and layer 2 mobility purposes. The cells may be categorized into activated cells and deactivated cells, where activated cells are cells that may actively communicate data and control information to the UE. The deactivated cells may be activated via layer 1 or layer 2 signaling. As a UE changes locations, different cells of the set of cells may be activated and deactivated.

The UE may adjust the timing of an uplink transmission to one of the cells by applying a timing advance (e.g., a timing advance value) to the uplink transmission, meaning that the timing of an uplink transmission may be "advanced" by an amount indicated by a timing advance value. A UE may apply different timing advances to uplink transmissions to the different cells in the set of cells. The UE may apply a same timing advance to cells sharing a same timing advance group (TAG) identifier. An initial timing advance value may be indicated in a random access response (RAR) message. Additional timing advance adjustments (e.g., to compensate for changing channel conditions or for a change in the location of the UE) for activated cells may be indicated to the UE via a medium access control (MAC) control element (CE). Timing advance adjustments may not be indicated to the UE, however, for deactivated cells. Accordingly, a timing advance for a deactivated cell may become inaccurate or expired over time. When a deactivated cell is activated, the timing advance to apply for uplink transmissions may therefore be inaccurate. The UE may obtain updated timing advance information for a deactivated cell via performing a random access channel (RACH) procedure with the deactivated cell. RACH procedures, however, may be associated with high power consumption and may not satisfy low latency demands for layer 1 and layer 2 mobility.

Aspects of the present disclosure relate to refining timing advances via transmission by a UE of a sounding reference signal (SRS) to one or more deactivated cells. The network may decode SRS(s) transmitted by a UE to a deactivated cell to identify updated timing advance information for a uplink transmission by the UE to the deactivated cell. For example, the network may configure a set of cells including an active cell (or multiple activated cells) and a deactivated cell (or multiple deactivated cells). The network may indicate a triggering condition and communication resources for the UE to transmit an SRS (or a burst of SRSs) to a deactivated cell of the one or more deactivated cells. Based on identifying that the triggering condition has been satisfied, the UE may transmit the SRS(s) to the deactivated cell using the indicated communication resource. The network may decode the SRS(s) and identify updated timing advance information. The network may indicate the updated timing advance information to the UE, and accordingly, when the deactivated cell is activated, the UE may have updated timing advance information to apply to an uplink transmission to the newly activated (previously deactivated) cell.

In some cases, the triggering condition may be a control message (e.g., a MAC-CE or a downlink control information (DCI) message) triggering the UE to transmit an aperiodic SRS to the deactivated cell. In some cases, the control message may be a message indicating activation of the deactivated cell. In some cases, the UE may be configured to periodically transmit an SRS to the deactivated cell using the configured communication resource, and the triggering condition is the periodicity. In some cases, the triggering condition may be a threshold timing difference between reception of a downlink signal from the deactivated cell and a reference cell.

Aspects of the disclosure are initially described in the context of wireless communications systems. Aspects of the disclosure are further illustrated by and described with reference to process flows, apparatus diagrams, system diagrams, and flowcharts that relate to uplink synchronization refinement for inter-cell mobility.

FIG. 1 illustrates an example of a wireless communications system 100 that supports uplink synchronization refinement for inter-cell mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink synchronization refinement for inter-cell mobility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The network may indicate to a UE 115 (e.g., via RRC signaling) a set of cells for layer 1 and layer 2 mobility purposes. The cells may be categorized into activated cells and deactivated cells. The deactivated cells may be activated via layer 1 or 2 signaling. As a UE 115 changes locations, different cells of the set of cells may be activated and deactivated. A UE 115 may apply different timing advances to uplink transmissions to the different cells in the set of cells. The UE 115 may apply a same timing advance to cells sharing a same TAG identifier. An initial timing advance value may be indicated in a RAR message. Additional timing advance adjustments (e.g., to compensate for changing channel conditions or for a change in the location of the UE 115) for activated cells may be indicated to the UE 115 via MAC-CE. Timing advance adjustments may not be indicated to the UE 115, however, for deactivated cells. Accordingly, a timing advance for a deactivated cell may become inaccurate or expired over time.

For a configured set of cells including an active cell (or multiple activated cells) and a deactivated cell (or multiple deactivated cells). The network may indicate a triggering condition and communication resources for the UE 115 to transmit an SRS to the deactivated cell (or deactivated cells). Based on identifying that the triggering condition has been satisfied, the UE 115 may transmit the SRS to the deactivated cell using the indicated communication resource. The network may decode the SRS and identify updated timing advance information. The network may indicate the updated timing advance information to the UE 115. Accordingly, when the deactivated cell is activated, the UE 115 may have updated timing advance information to apply to uplink transmissions to the newly activated (previously deactivated) cell.

Figure 2:
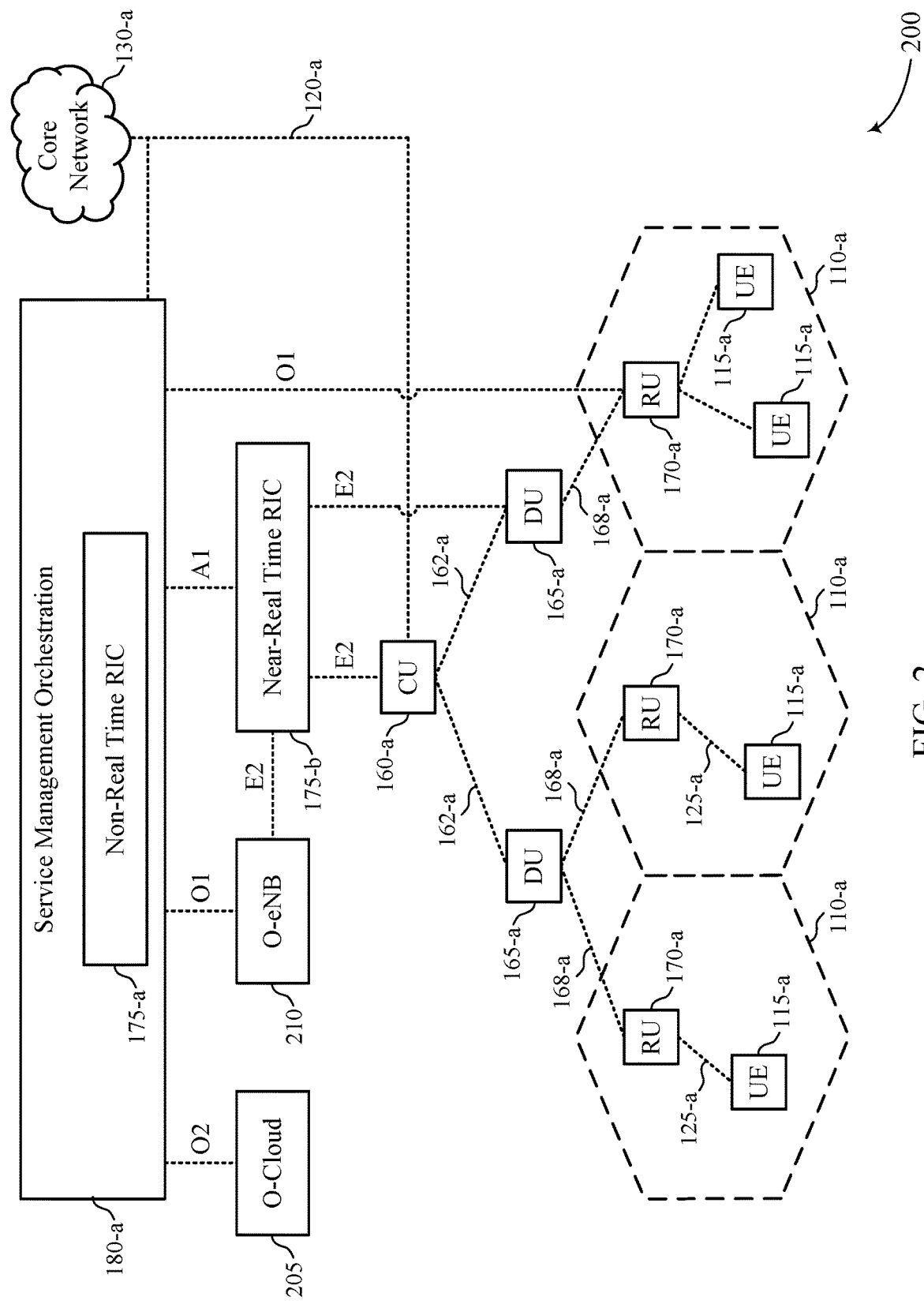
FIG. 2 illustrates an example of a network architecture that supports uplink synchronization refinement for inter-cell mobility in accordance with one or more aspects of the present disclosure.

FIG. 2 illustrates an example of a network architecture 200 (e.g., a disaggregated base station architecture, a disaggregated RAN architecture) that supports uplink synchronization refinement for inter-cell mobility in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
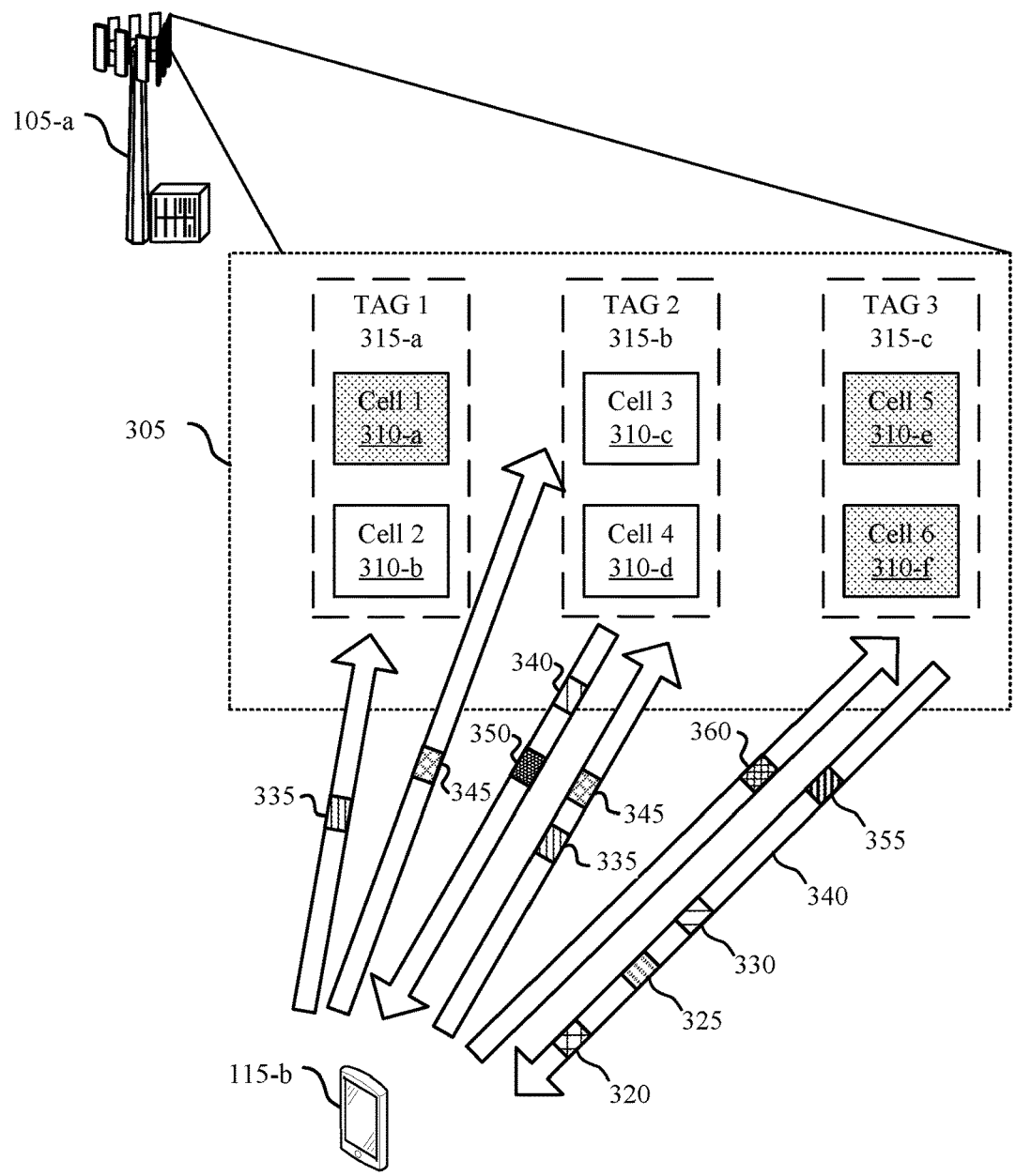
FIG. 3 illustrates an example of a wireless communications system that supports uplink synchronization refinement for inter-cell mobility in accordance with one or more aspects of the present disclosure.

FIG. 3 illustrates an example of a wireless communications system 300 that supports uplink synchronization refinement for inter-cell mobility in accordance with one or more aspects of the present disclosure. In some examples, wireless communications system 300 may implement one or more aspects of wireless communications system 100. For instance, a UE 115-*b* and a network entity 105-*a* may be respective examples of a UE 115 and a network entity 105 as described herein.

The network entity 105 a may be associated with one or more cells (e.g., a first cell 310-*a*, a second cell 310-*b*, a third cell 310-*c*, a fourth cell 310-*d*, a fifth cell 310-*e*, and a sixth cell 310-*f*) that may be configured for layer 1 and layer 2 mobility (e.g., as part of a CellGroupConfig). In some cases, each cell group may include at least one primary cell (PCell) and zero or more secondary cells (SCells). For example, one of the first cell 310-*a*, the second cell 310-*b*, the third cell 310-*c*, the fourth cell 310-*d*, the fifth cell 310-*e*, or the sixth cell 310-*f* may be configured as a PCell. As used herein, primary cell and/or PCell may be, refer to, or include one or both of a primary cell (PCell) or a primary secondary cell (PSCell). In some examples, a PCell may be used for communication of control information (e.g., system information blocks (SIBs) via a physical control channel). As such, the UE 115-*b* may communicate with the network entity 105-*a* via one or more cells of the set of cells 305. For example, the network entity 105-*a* may transmit a cell configuration message 320 (e.g., via RRC signaling) to the UE 115-*b*, configuring the set of cells 305 for use at the UE 115-*a*. In some cases, each of the cells of the set of cells 305 may be associated with a same DU 165 of the network entity 105-*a* or different DUs 165 of the network entity 105-*a*. For example, the network entity may transmit the cell configuration message 320, and other control signaling, via the sixth cell 3104, which may be configured as the special cell (SpCell), where the SpCell refers to a PCell+PSCell. In some cases, the UE 115-*b* may transmit an acknowledgement to the network entity 105-*a* (e.g., via the SpCell 310-*f*) acknowledging that the UE 115-*b* successfully received the cell configuration message 320.

Each of the cells of the set of cells 305 may be activated or deactivated. For example, as illustrated, the first cell 310-*a*, the fifth cell 310-*e*, and the sixth cell 310-*f* may be activated, and the second cell 310-*b*, the third cell 310-*c*, and the fourth cell 310-*d* may be deactivated. In some cases, an activated cell group may be readily used for data and control information transmissions and a deactivated cell group may be readily activated via layer 1 and layer 2 signaling. In some examples, each cell of the set of cells 305 may be associated with a geographic location. As such, as the UE 115-*b* moves, the network entity 105-*a* may update which cells of the set of cells 305 are activated or deactivated for use at the UE 115-*b*. In some cases, signaling related to updating cell groups 205 may be done via RRC signaling (e.g., via L3).

Uplink transmission synchronization for the UE 115-*b* may be accomplished via timing advance information management. The network entity 105-*a* may assigning timing advance group (TAG) information to different cells of the set of cells 305 based on the cell location, the operating band of the cell, or the location of the UE 115-*b*. Cells may share a TAG assignment. For example, the first cell 310-*a* and the second cell 310-*b* may share a first TAG 315-*a*, the third cell 310-*c* and the fourth cell 310-*d* may share a second TAG 315-*b*, and the fifth cell 310-*e* and the sixth cell 310-*f* may share a third TAG 315-*c*. Mobility within the configured cell set may be accomplished through layer 1 and layer 2 signaling by fast activation and deactivation of cells within the set of cells 305.

After TAGs are assigned to cells of the set of cells 305, initial timing advance information for the UE 115-*b* may be obtained through a RAR message during a RACH procedure. For example, the UE 115-*b* may initiate a RACH to the SpCell of the set of cells 305. For example, the sixth cell 310-*f* may be configured as the SpCell. To obtain initial SCell timing advance information, the UE 115-*b* may perform physical downlink control channel (PDCCH) order RACH with the SCell. The UE may perform a RACH procedure with one cell per TAG, as cells with the same TAG assignment share the same timing advance information. For example, timing advance information for the first cell 310-*a* may be used for the second cell 310-*b* as the first cell 310-*a* and the second cell 310-*b* share the first TAG 315-*a*.

Timing advance information may be updated by the network entity 105-*a* via a MAC-CE. For deactivated cells (e.g., the second cell, 310-*b*, the third cell 310-*c*, and the fourth cell 310-*d*), however, the timing advance information may not be frequently updated through a MAC-CE. Accordingly, the initial timing advance information for deactivated cells may expire or become inaccurate due to mobility of the UE 115-*b* or a change of wireless conditions. The UE 115-*b* may perform a RACH procedure with a deactivated cell to obtain updated timing advance information. RACH procedures, however, may be associated with a large power consumption and may not satisfy low latency layer 1 and layer 2 mobility targets. Accordingly, the UE 115-*b* and the network entity 105-*a* may utilize techniques to facilitate fast timing advance information updates for deactivated cells without using RACH procedures, which may improve mobility support, reduce delay and power consumption, and improve system performance in terms of increased quality of service, higher throughput, and higher efficiency.

For example, depending on a timing advance accuracy target for deactivated cells, the network entity 105-*a* may initiate a timing advance refinement procedure on deactivated cells, for example at the time of cell activation before data transmission to a cell. In some cases, the UE 115-*a* may be configured by the network entity 105-*a* to proactively transmit uplink signaling (e.g., one or more SRSs) to the network entity 105-*a* to update the timing advance information of deactivated cells. Such techniques may avoid legacy RACH procedures for timing advance information for deactivated cells and may reduce uplink signaling overhead for deactivated cells. Timing advance refinement may be based on SRS transmissions from the UE 115-*b*. For example, the network entity 105-*a* may indicate a resource for an SRS (or multiple SRSs) for transmission to a deactivated cell and a triggering condition for transmitting the SRS 335 (or multiple SRSs 335). For example, the RRC signaling 320 configuring the set of cells 305 for the UE 115-*b* may also indicate the communication resource for the SRS(s) 335 and the triggering condition. In some examples, control signaling 325 (e.g., a MAC-CE or DCI transmitted to the UE 115-*b* via the SpCell (e.g., the sixth cell 310-*f*))) may indicate the communication resource for the SRS(s) 335 and the triggering condition (or may supersede an earlier indication of the set of cells, the communication resource, or the triggering condition indicated in the RRC signaling 320).

In some examples, as described herein, the UE 115-*b* may transmit aperiodic or semi-persistent SRS 335 per a request from the network entity 105-*a* (e.g., the triggering condition is a request from the network entity). In some cases, the network entity 105-*a* may signal an estimated timing advance for transmitting the SRS 335. In some cases, the UE 115-*b* may be configured to periodically transmit an SRS 335 (e.g., the triggering condition is a configured period). In some cases, the UE 115-*b* may trigger an aperiodic or semi-persistent SRS (e.g., satisfaction of a configured triggering condition may be identified by the UE 115-*b*).

In some examples, the network entity 105-*a* may transmit control signaling 330 triggering the UE 115-*b* to transmit an SRS 335 to a deactivated cell (e.g., one of the second cell 310-*b*, the third cell 310-*c*, or the fourth cell 310-*d*). The control signaling 330 may be transmitted to the UE 115-*b* via the SpCell (e.g., the sixth cell 310-*f*). For example, the control signaling 330 may be signaling activating a deactivated cell (e.g., one of the second cell 310-*b*, the third cell 310-*c*, or the fourth cell 310-*d*) or dedicated MAC-CE signaling. The network entity 105-*a* may indicate an estimated timing advance to apply to the SRS 335. The UE 115-*b* may transmit the SRS to the indicated deactivated cell (e.g., one of the second cell 310-*b*, the third cell 310-*c*, or the fourth cell 310-*d*). Once the network entity 105-*a* successfully decodes the SRS 335 transmitted to the deactivated cell, the network entity 105-*a* may transmit control signaling 340 indicating updated timing advance information for the deactivated cell (which may be newly activated). For example, the network entity 105-*a* may transmit the control signaling 340 via the SpCell (e.g., the sixth cell 310-*f*) or the newly activated cell (e.g., the fourth cell 310-*d* as shown in FIG. 3). The UE 115-*b* may apply the indicated timing advance information to one or more uplink transmissions 345 to the deactivated cell after the deactivated cell is activated. In some cases, the network entity 105-*a* may also adjust the TAG of the deactivated cell based on the decoded SRS 335. For example, the network entity 105-*a* may switch the fourth cell 310-*d* to the first TAG 315-*a* based on the decoded SRS 335 that was transmitted to the fourth cell 310-*d*. In some cases, the SRS 335 may be a burst of SRSs 335 (e.g., a burst of aperiodic SRSs) spanning a period of x milliseconds in order to ensure that the SRS 335 is received at the network entity 105-*a*. The network entity 105-*a* may configure the UE 115-*a* (e.g., in the RRC signaling 320 or the control signaling 325) to transmit the burst of SRSs 335, for example, the network entity 105-*a* may configure the parameter x.

In some cases, the UE 115-*b* may be configured by the network entity 105-*a* (e.g., via the RRC signaling 320 or the control signaling 325) to periodically transmit SRSs to a deactivated cell (e.g., one of the second cell 310-*b*, the third cell 310-*c*, or the fourth cell 310-*d*). Periodic transmission of SRSs to a deactivated cell may maintain accurate timing advance information for a selected TAG (e.g., the TAG containing a candidate SpCell). In an example, the UE 115-*b* may be configured to send a periodic SRS 335 to a selected list of one or more deactivated cells. In some cases, the UE 115-*b* may be configured to transmit a periodic SRS 335 to one deactivated cell per TAG (e.g., one of the third cell 310-*c* or the fourth cell 310-*d* which are both assigned to the second TAG 315-*b*). The network entity 105-*a* may update the TAG assignments and which cell to transmit the SRS to in the control signaling 325 (e.g., a MAC-CE or DCI message). Based on the periodic SRSs 335, the network entity 105-*a* may accordingly periodically update the timing advance information for the UE 115-*b* for the selected deactivated cells of the each TAG. The network entity 105-*a* may indicate the updated timing advance information to the UE 115-*b* in the control signaling 340. The network entity 105-*a* may also adjust the cells that are assigned to each TAG based on the SRS signal strength for the reference cell (e.g., the cell that received the periodic SRS 335 per TAG) and the downlink measurements reported by the UE 115-*a*. For example, the network entity 105-*a* may transmit downlink reference signals 350 from a deactivated cell (e.g., the fourth cell 310-d as shown in FIG. 3) and downlink reference signals 355 from another reference cell (e.g., the sixth cell 310-f as shown in FIG. 3), which the UE 115-b may measure and report in a reporting message 360. The UE 115-b may transmit the reporting message to the network entity 105-a via the SpCell (e.g., the sixth cell 310-f).

When a deactivated cell is activated, the UE 115-b may accordingly apply the updated timing advance information for the TAG assigned to that newly activated cell to one or more uplink transmissions 345 to the newly activated cell. For example, the UE 115-b may transmit periodic SRSs to the fourth cell 310-d, and receive control signaling 340 indicating periodic updates for the timing advance for the second TAG 315-b which includes the fourth cell 310-d. When either of the third cell 310-c or the fourth cell 310-d are activated, the UE 115-d may apply the updated timing advance information to uplink transmissions 345 to either of the third cell 310-c or the fourth cell 310-d. As compared to network entity triggered SRS transmission for timing advance refinement, periodic SRS transmission may reduce latency but increase signaling overhead and power consumption.

In some cases, the network entity 105-a may configure the UE 115-a to identify a triggering condition for transmission of an SRS 335 to a deactivated cell (e.g., the triggering condition may be identified in the RRC signaling 320 or control signaling 325). For example, the RRC signaling 320 or the control signaling 325 may indicate the list of activated and deactivated cells of the set of cells 305 and a triggering condition for transmission of an SRS 335 to the deactivated cell(s). In some examples, the network entity 105-a may update the list using control signaling, such as MAC CE or DCI. The triggering condition may be a timing difference change between reception of downlink reference signals from a deactivated cell and a reference cell. For example, a deactivated cell (e.g., the fourth cell 310-d) may periodically transmit downlink reference signals 350, and a reference cell (e.g., the sixth cell 310-f) may periodically transmit downlink reference signals 355. The UE 115-b may determine the timing difference between reception of a downlink reference signal 350 from the deactivated cell and the reception of the downlink reference signal 355 from the reference cell. If the timing difference changes by a threshold amount (e.g., where the threshold amount may be configured in the RRC signaling or the control signaling 325), the UE 115-b may transmit an SRS 335 (e.g., a one-time SRS transmission or multiple SRS transmissions) to the deactivated cell (e.g., the fourth cell 310-d) or to a list of deactivated cells.

If the UE 115-a is configured by the RRC signaling 320 or the control signaling 325 to transmit an aperiodic SRS 335, the UE 115-b may transmit the aperiodic SRS 335 using the initial timing advance information for the deactivated cell or to a list of deactivated cells. If the UE 115-a is configured by the RRC signaling 320 or the control signaling 325 to transmit a semi-persistent SRS 335, the UE 115-b may transmit a first SRS 335 to the deactivated cell or to a list of deactivated cells using the initial advance information for the deactivated cell or to a list of deactivated cells and then may repeat the SRS 335 for N times during the next x milliseconds (where N and x may be configured by the RRC signaling 320 or the control signaling 325).

The network entity 105-a may update timing advance information for the deactivated cells of each TAG when the network entity 105-a decodes the SRS(s). The network entity 105-a may transmit control signaling 340 to the UE 115-b indicating the updated timing advance information for the deactivated cell(s). The network entity 105-a may also adjust the cells that are assigned to each TAG based on the SRS signal strength for the reference cell (e.g., the cell that received the periodic SRS 335 per TAG) and the downlink measurements reported by the UE 115-a.

As compared to periodic SRS transmission, UE triggered SRS transmission may reduce signaling overhead. Timing advance refinement accuracy for UE triggered SRS transmission may depend on the definition of the triggering condition and the accuracy of the UE 115-b on detecting the triggering condition.

As described herein, the network entity 105-a may indicate the communication resources for the UE 115-b to transmit the SRS(s), for example in the RRC signaling 320 or the control signaling 325 (a MAC-CE or DCI message that may supersede a prior indication of the configured set of cells 305). If the UE 115-b is configured to transmit semi-persistent SRSs, the network entity 105-a may indicate (e.g., in the RRC signaling 320 or the control signaling 325) the time duration of the burst of SRSs and a number of SRSs in the burst (e.g., the RRC signaling 320 or the control signaling 325 may indicate the communication resources for the semi-persistent SRS). The network entity 105-a may also indicate via control signaling the cell information. For example, the RRC signaling 320 or the control signaling 325 may indicate which cells are activated or deactivated, which cell is the SpCell, and which deactivated cells to transmit the SRSs to. In some cases, the network entity 105-a may indicate the PDCCH search space configurations for the SCells to the UE 115-b in the RRC signaling 320 or the control signaling 325. In some cases, the network entity 105-a may transmit signaling indicating multiple communication resources for transmitting SRSs (e.g., in the RRC signaling 320), and subsequent control signaling 325 may indicate a selected communication resource of the multiple configured communication resources. In some cases, the network entity 105-a may transmit signaling indicating triggering conditions (e.g., thresholds) for transmitting SRSs (e.g., in the RRC signaling 320), and subsequent control signaling 325 may indicate a selected triggering condition of the multiple configured triggering conditions.

Figure 4:
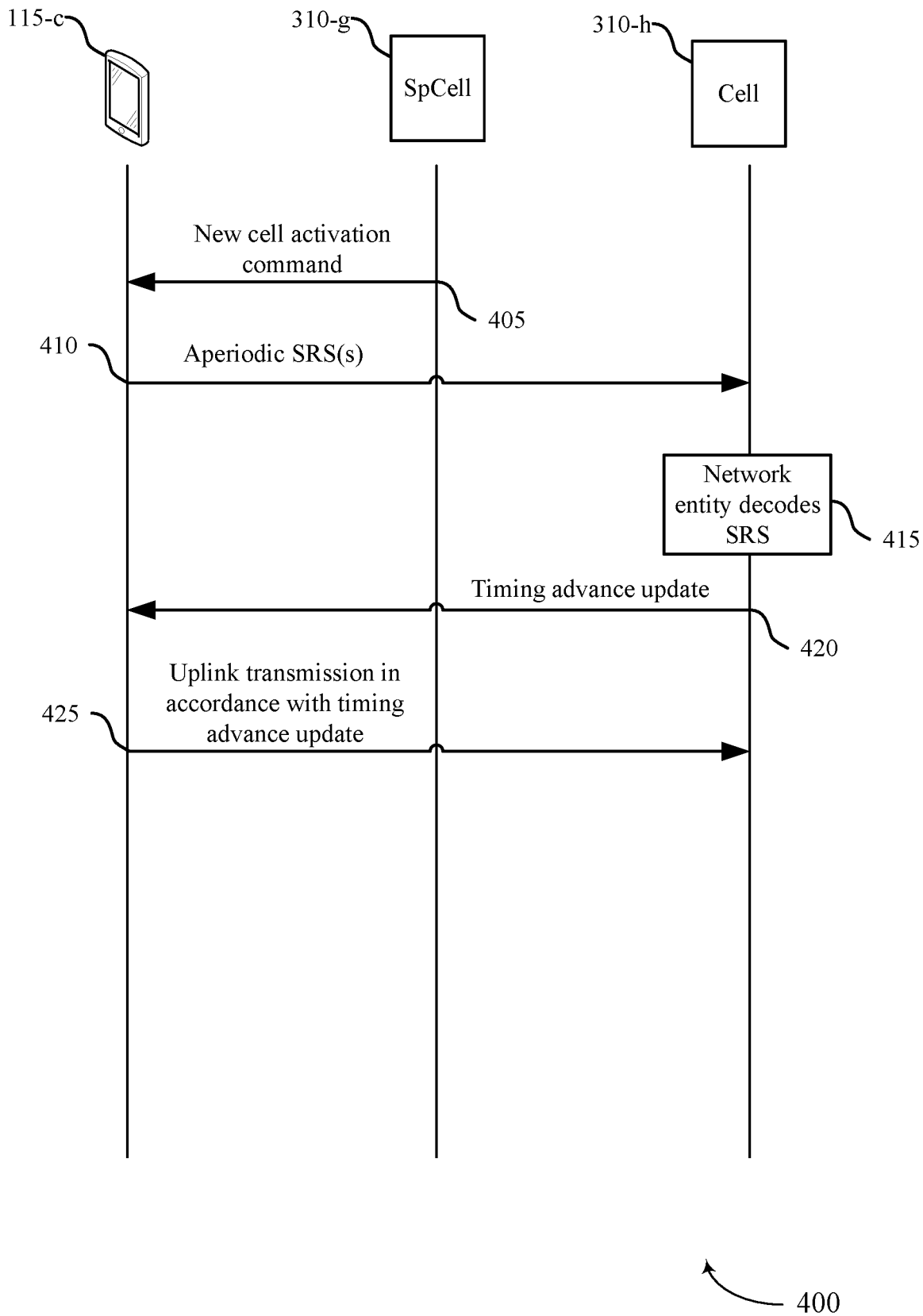
FIG. 4 illustrates an example of a process flow that supports uplink synchronization refinement for inter-cell mobility in accordance with one or more aspects of the present disclosure.

FIG. 4 illustrates an example of a process flow 400 that supports uplink synchronization refinement for inter-cell mobility in accordance with one or more aspects of the present disclosure. The process flow 400 may include a UE 115-c, which may be an example of a UE 115 as described herein. The process flow 400 may include a SpCell 310-g and a cell 310-h, which may be examples of cells 310 as described herein. In the following description of the process flow 400, the operations between the SpCell 310-g, the cell 310-h, and the UE 115-c may be transmitted in a different order than the example order shown, or the operations performed by the SpCell 310-g, the cell 310-h, and the UE 115-c may be performed in different orders or at different times. Some operations may also be omitted from the process flow 400, and other operations may be added to the process flow 400.

At 405, the UE 115-c may receive, from the SpCell 310-g, a new cell activation command indicating that the cell 310-h is being activated for the UE 115-c. The new cell activation command may be transmitted, for example, via a MAC-CE or DCI message. The network entity (e.g., via the SpCell 310-g), may also indicate an estimated timing advance value to apply for transmissions to the new cell 310-h. For example, the new cell activation command at 405 may include a timing advance value to apply to transmission of an SRS to the cell 310-h. In some cases, the UE 115-c may transmit an acknowledgement message to the SpCell 310-*g* acknowledging that the UE 115-*c* successfully received the cell activation command.

At 410, the UE 115-*c* may transmit an aperiodic SRS to the cell 310-*h* in response to the cell activation command received at 405. The UE 115-*c* may apply an initial timing advance to the SRS transmitted at 410 (e.g., a timing advance based on a RAR of a prior RACH procedure performed with the cell 310-*h*). In some cases, if the UE 115-*c* received an indication of timing advance information to apply to the SRS (e.g., in the cell activation command at 405), the UE 115-*c* may apply the indicated timing advance information to the SRS at 410.

At 415, a network entity 105 associated with the cell 310-*h* and the SpCell 310-*g* may decode the SRS transmitted at 410.

At 420, based on the decoded SRS, the network entity 105 may transmit, to the UE 115-*c* via the cell 310-*h*, updated timing advance information (e.g., via a MAC-CE or a DCI message).

At 425, the UE 115-*c* may transmit an uplink transmission to the newly activated cell 310-*h* in accordance with the timing advance update.

Figure 5:
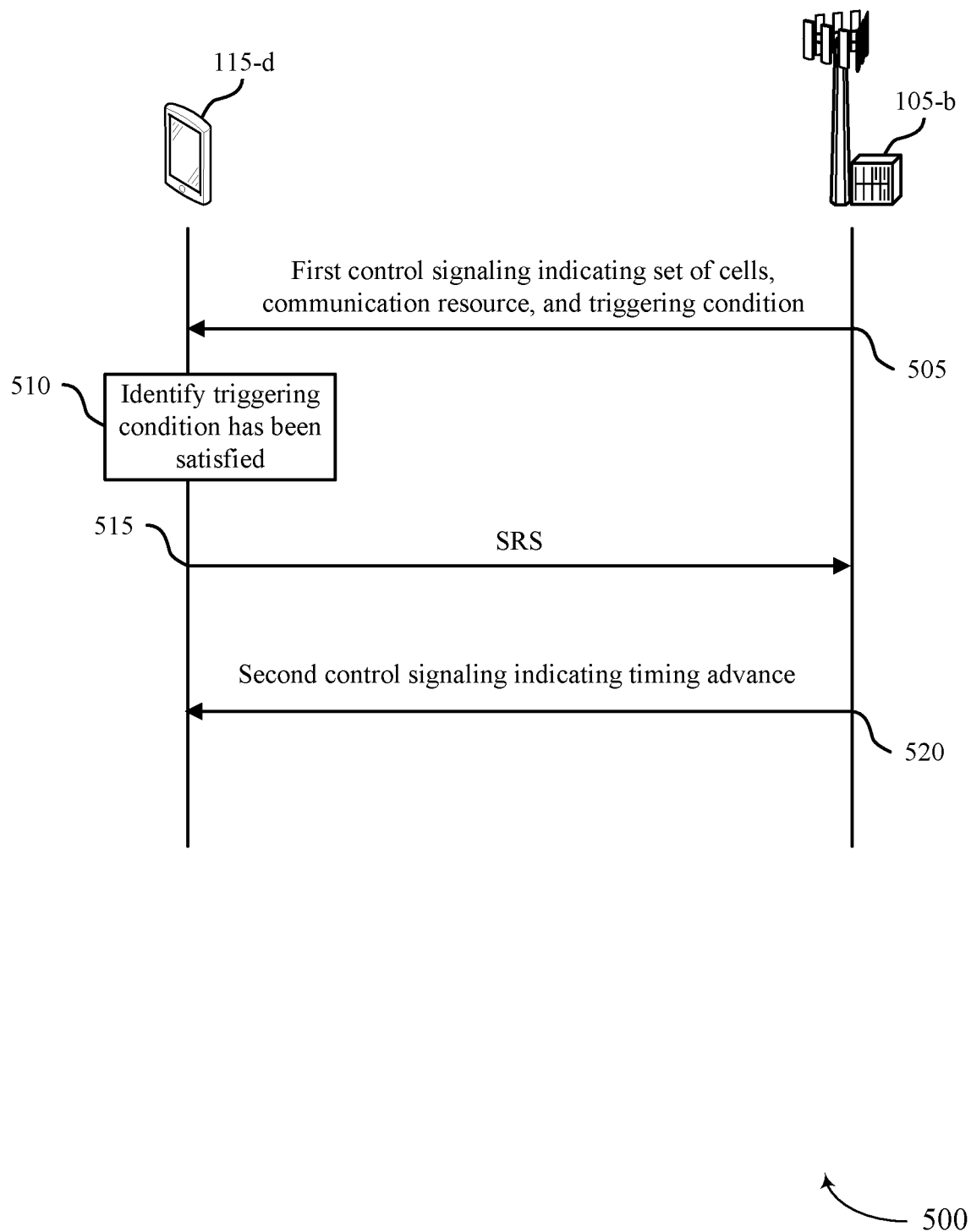
FIG. 5 illustrates an example of a process flow that supports uplink synchronization refinement for inter-cell mobility in accordance with one or more aspects of the present disclosure.

FIG. 5 illustrates an example of a process flow 500 that supports uplink synchronization refinement for inter-cell mobility in accordance with one or more aspects of the present disclosure. The process flow 500 may include a UE 115-*d*, which may be an example of a UE 115 as described herein. The process flow 500 may include a network entity 105-*b*, which may be an example of a network entity 105 as described herein. In the following description of the process flow 500, the operations between the network entity 105-*b* and the UE 115-*d* may be transmitted in a different order than the example order shown, or the operations performed by the network entity 105-*b* and the UE 115-*d* may be performed in different orders or at different times. Some operations may also be omitted from the process flow 500, and other operations may be added to the process flow 500.

At 505, the UE 115-*d* may receive, from the network entity 105-*b*, first control signaling indicating a set of cells including one or more activated cells and one or more deactivated cells. The first control signaling may further indicate both a triggering condition associated with transmission of an SRS and a communication resource for the transmission of the SRS. The transmission of the SRS may be associated with a timing advance update for one or more uplink transmissions to a deactivated cell of the one or more deactivated cells. In some examples, after the UE 115-*d* receives the control signaling at 505, the UE 115-*d* may transmit an acknowledgement message to the network entity 105-*b* (e.g., via the SpCell) acknowledging that the UE 115-*d* successfully received the control signaling.

At 510, the UE 115-*d* may identify that the triggering condition has been satisfied for the deactivated cell.

At 515, the UE 115-*d* may transmit, and the network entity 105-*b* may receive, via the deactivated cell, the SRS using the communication resource associated with the deactivated cell based on identifying at 510 that the triggering condition associated with the deactivated cell has been satisfied.

At 520, the UE 115-*d* may receive, from the network entity 105-*b* and in response to the SRS, second control signaling indicating a timing advance associated with an uplink transmission to the deactivated cell.

In some cases, receiving the first control signaling at 505 may include receiving an indication of a periodicity associated with the transmission of the SRS, and the triggering condition corresponds to a transmission occasion associated with the periodicity. In some cases, the UE 115-*d* may receive, from the network entity 105-*b*, third control signaling activating the deactivated cell, and the UE 115-*d* may transmit, in response to the third control signaling, and the network entity may receive, via the deactivated cell, an uplink transmission in accordance with the timing advance. In some cases, the UE 115-*d* may receive, from the network entity 105-*b*, third control signaling activating a second deactivated cell of the set of cells, the second deactivated cell associated with a same timing advance group as the deactivated cell. The UE 115-*d* may transmit, in response to the third control signaling, and the network entity may receive, via the second deactivated cell, the uplink transmission in accordance with the timing advance.

In some cases, the UE 115-*d* may receive, from the network entity 105-*b*, third control signaling indicating to transmit the SRS, and the triggering condition may be the reception of the third control signaling. In some cases, receiving the third control signaling includes receiving an indication of a cell activation command for the deactivated cell. In some cases, the UE 115-*d* may transmit, and the network entity 105-*b* may receive, via the deactivated cell, the uplink transmission in accordance with the timing advance. In some cases, receiving the third control signaling includes receiving an indication of a second timing advance to apply to transmission of the SRS.

In some cases, the UE 115-*d* may receive downlink signals from the deactivated cell and downlink signals from a reference cell of the set of cells. The UE 115-*d* may identify a timing difference between reception of respective downlink signals received from the deactivated cell and downlink signals from the reference cell. The triggering condition may be a timing difference change between subsequent timing differences exceeding a threshold level.

In some cases, the UE 115-*d* may transmit a burst of SRSs. For example, the UE may transmit, and the network entity 105-*b* may receive, via the deactivated cell, a set of multiple SRSs via a set of multiple communication resources.

In some cases, receiving the second control signaling at 520 includes receiving the second control signaling via a MAC-CE or a DCI message.

In some cases, receiving the first control signaling includes receiving the first control signaling via a MAC-CE or a DCI message, and the first control signaling supersedes a prior indication of the set of cells (e.g., a prior indication received via RRC).

In some cases, the UE 115-*d* may receive, from the network entity 105-*b*, third control signaling prior to the first control signaling, the third control signaling indicating a set of multiple communication resources that include the communication resource. Receiving the first control signaling may include receiving the first control signaling via a MAC-CE or a DCI message that indicates the communication resource from the set of multiple communication resources.

Figure 6:
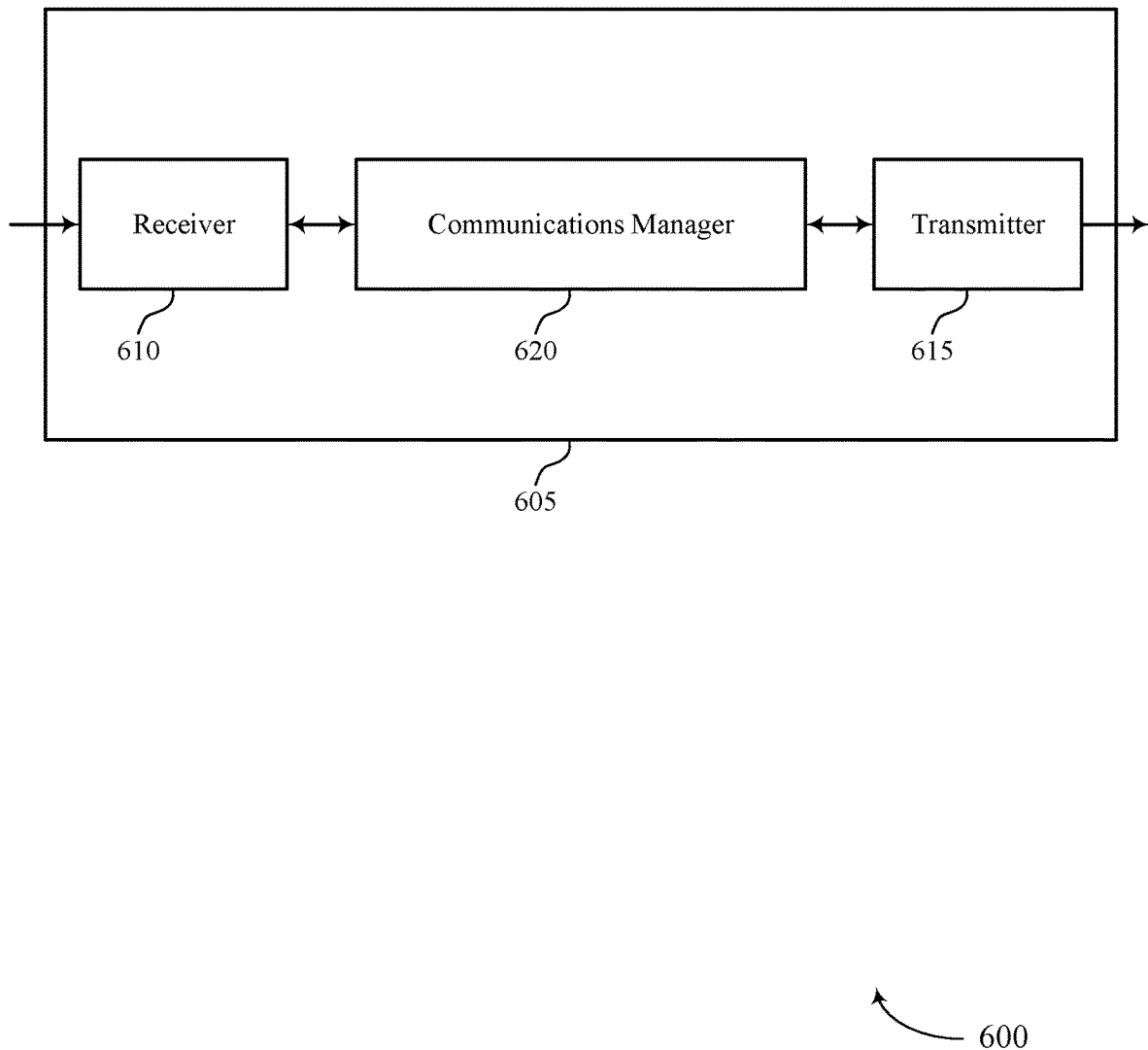
FIGS. 6 and 7 show block diagrams of devices that support uplink synchronization refinement for inter-cell mobility in accordance with one or more aspects of the present disclosure.

FIG. 6 shows a block diagram 600 of a device 605 that supports uplink synchronization refinement for inter-cell mobility in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink synchronization refinement for inter-cell mobility). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink synchronization refinement for inter-cell mobility). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink synchronization refinement for inter-cell mobility as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving, from a network entity, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The communications manager 620 may be configured as or otherwise support a means for transmitting the SRS to the deactivated cell using the communication resource associated with the deactivated cell based on identifying that the triggering condition associated with the deactivated cell has been satisfied. The communications manager 620 may be configured as or otherwise support a means for receiving, from the network entity and in response to the SRS, second control signaling indicating a timing advance associated with an uplink transmission to the deactivated cell.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
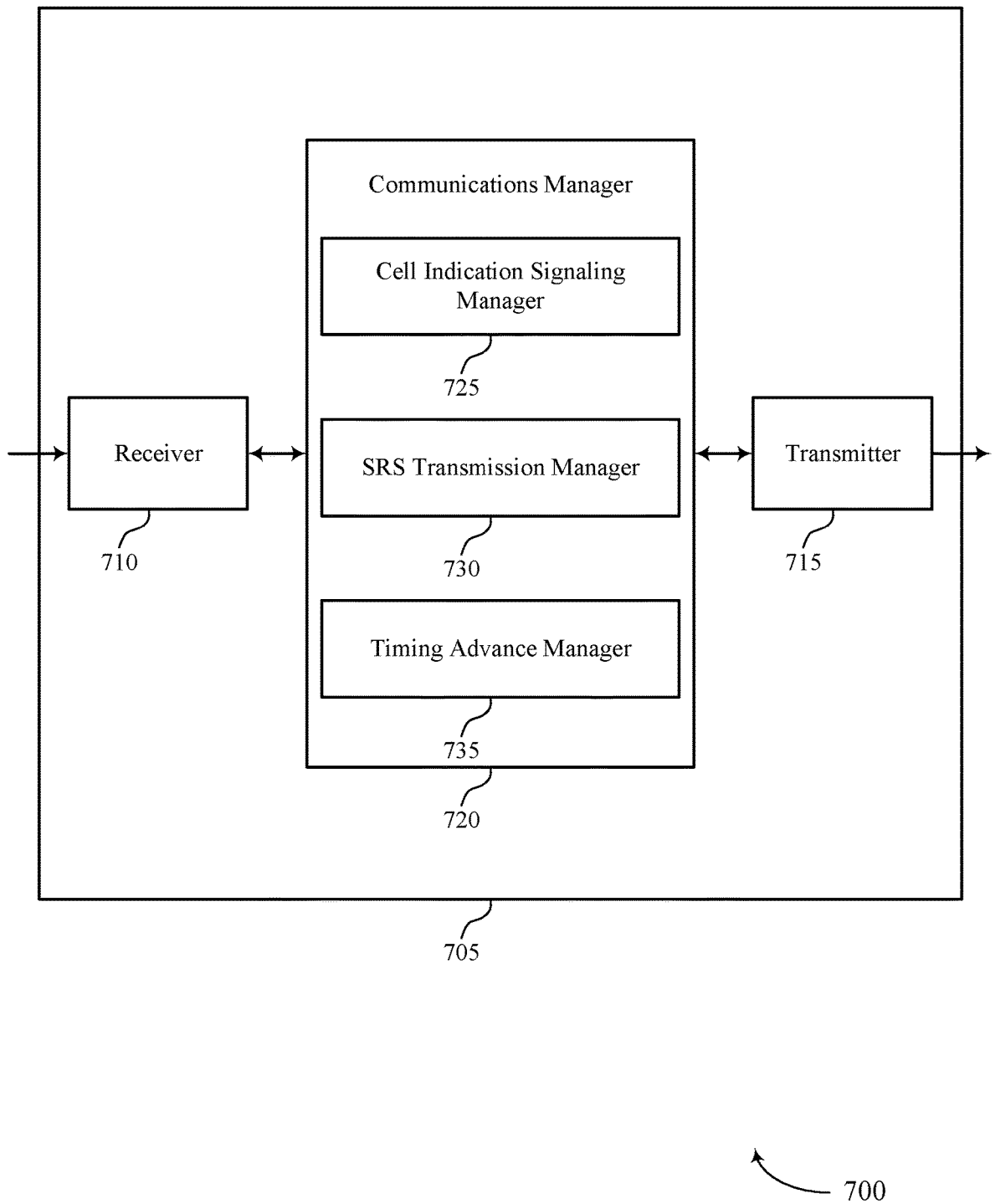

FIG. 7 shows a block diagram 700 of a device 705 that supports uplink synchronization refinement for inter-cell mobility in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink synchronization refinement for inter-cell mobility). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink synchronization refinement for inter-cell mobility). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink synchronization refinement for inter-cell mobility as described herein. For example, the communications manager 720 may include a cell indication signaling manager 725, an SRS transmission manager 730, a timing advance manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The cell indication signaling manager 725 may be configured as or otherwise support a means for receiving, from a network entity, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The SRS transmission manager 730 may be configured as or otherwise support a means for transmitting the SRS to the deactivated cell using the communication resource associated with the deactivated cell based on identifying that the triggering condition associated with the deactivated cell has been satisfied. The timing advance manager 735 may be configured as or otherwise support a means for receiving, from the network entity and in response to the SRS, second control signaling indicating a timing advance associated with an uplink transmission to the deactivated cell.

Figure 8:
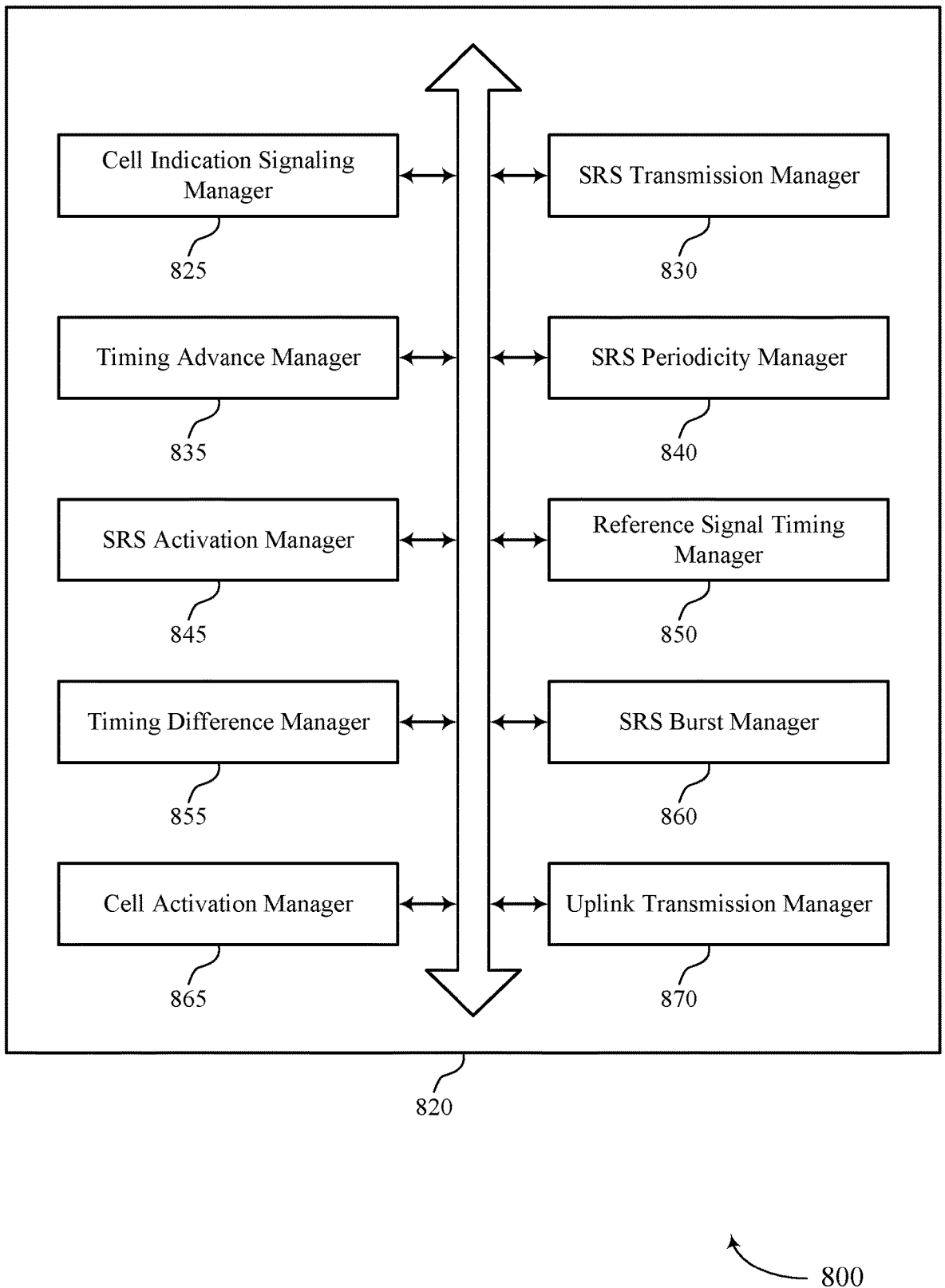
FIG. 8 shows a block diagram of a communications manager that supports uplink synchronization refinement for inter-cell mobility in accordance with one or more aspects of the present disclosure.

FIG. 8 shows a block diagram 800 of a communications manager 820 that supports uplink synchronization refinement for inter-cell mobility in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink synchronization refinement for inter-cell mobility as described herein. For example, the communications manager 820 may include a cell indication signaling manager 825, an SRS transmission manager 830, a timing advance manager 835, an SRS periodicity manager 840, an SRS activation manager 845, a reference signal timing manager 850, a timing difference manager 855, an SRS burst manager 860, a cell activation manager 865, an uplink transmission manager 870, or any combination thereof. Each of these components may communicate, directly or indirectly, with one another (e.g., via one or more buses).

The communications manager 820 may support wireless communications at a UE in accordance with examples as disclosed herein. The cell indication signaling manager 825 may be configured as or otherwise support a means for receiving, from a network entity, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The SRS transmission manager 830 may be configured as or otherwise support a means for transmitting the SRS to the deactivated cell using the communication resource associated with the deactivated cell based on identifying that the triggering condition associated with the deactivated cell has been satisfied. The timing advance manager 835 may be configured as or otherwise support a means for receiving, from the network entity and in response to the SRS, second control signaling indicating a timing advance associated with an uplink transmission to the deactivated cell.

In some examples, to support receiving the first control signaling, the SRS periodicity manager 840 may be configured as or otherwise support a means for receiving an indication of a periodicity associated with the transmission of the SRS, where the triggering condition corresponds to a transmission occasion associated with the periodicity.

In some examples, the cell activation manager 865 may be configured as or otherwise support a means for receiving, from the network entity, third control signaling activating the deactivated cell. In some examples, the uplink transmission manager 870 may be configured as or otherwise support a means for transmitting, to the deactivated cell in response to the third control signaling, the uplink transmission in accordance with the timing advance.

In some examples, the cell activation manager 865 may be configured as or otherwise support a means for receiving, from the network entity, third control signaling activating a second deactivated cell of the set of cells, the second deactivated cell associated with a same timing advance group as the deactivated cell. In some examples, the uplink transmission manager 870 may be configured as or otherwise support a means for transmitting, to the second deactivated cell in response to the third control signaling, the uplink transmission in accordance with the timing advance.

In some examples, the SRS activation manager 845 may be configured as or otherwise support a means for receiving, from the network entity, third control signaling indicating to transmit the SRS, where the triggering condition includes reception of the third control signaling.

In some examples, to support receiving the third control signaling, the cell activation manager 865 may be configured as or otherwise support a means for receiving an indication of a cell activation command for the deactivated cell.

In some examples, the uplink transmission manager 870 may be configured as or otherwise support a means for transmitting, to the deactivated cell, the uplink transmission in accordance with the timing advance.

In some examples, to support receiving the third control signaling, the SRS transmission manager 830 may be configured as or otherwise support a means for receiving an indication of a second timing advance to apply to transmission of the SRS.

In some examples, the reference signal timing manager 850 may be configured as or otherwise support a means for receiving, from the deactivated cell, a first downlink signal. In some examples, the reference signal timing manager 850 may be configured as or otherwise support a means for receiving, from a reference cell of the set of cells, a second downlink signal. In some examples, the timing difference manager 855 may be configured as or otherwise support a means for identifying a timing difference between reception of the first downlink signal and the second downlink signal, where the triggering condition includes a timing difference change between the timing difference and a prior timing difference exceeding a threshold.

In some examples, the SRS burst manager 860 may be configured as or otherwise support a means for transmitting a set of multiple SRSs to the deactivated cell via a set of multiple communication resources, the set of multiple SRSs including the SRS and the set of multiple communication resources including the communication resource.

In some examples, to support receiving the second control signaling, the timing advance manager 835 may be configured as or otherwise support a means for receiving the second control signaling via one of a MAC-CE or a downlink control information message.

In some examples, to support receiving the first control signaling, the cell indication signaling manager 825 may be configured as or otherwise support a means for receiving the first control signaling via one of a MAC-CE or a downlink control information message, the first control signaling superseding a prior indication of the set of cells.

In some examples, the cell indication signaling manager 825 may be configured as or otherwise support a means for receiving, from the network entity, third control signaling indicating a set of multiple communication resources including the communication resource, where receiving the first control signaling includes receiving one of a MAC-CE or a downlink control information message indicating the communication resource of the set of multiple communication resources.

Figure 9:
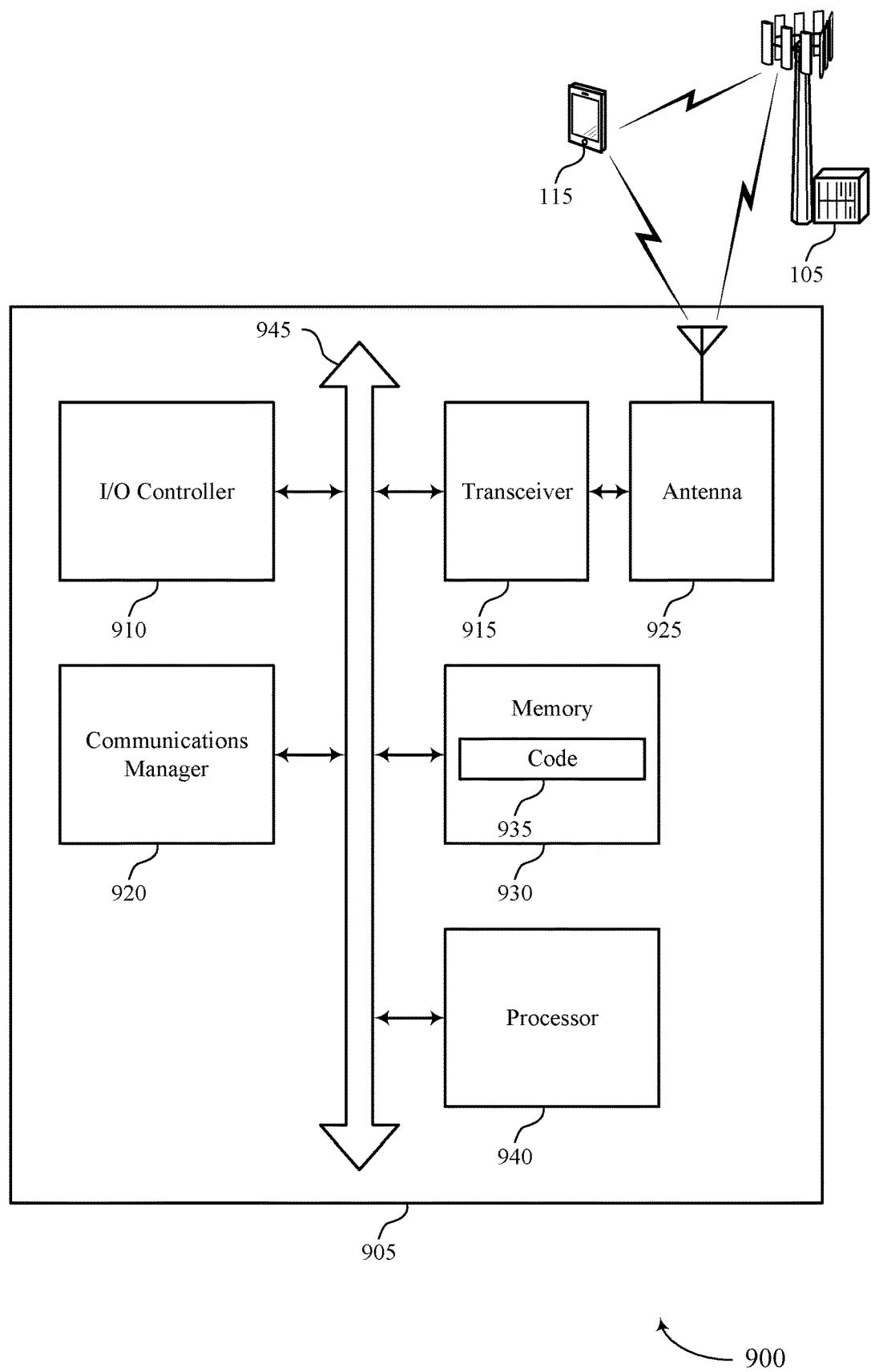
FIG. 9 shows a diagram of a system including a device that supports uplink synchronization refinement for inter-cell mobility in accordance with one or more aspects of the present disclosure.

FIG. 9 shows a diagram of a system 900 including a device 905 that supports uplink synchronization refinement for inter-cell mobility in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink synchronization refinement for inter-cell mobility). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a network entity, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The communications manager 920 may be configured as or otherwise support a means for transmitting the SRS to the deactivated cell using the communication resource associated with the deactivated cell based on identifying that the triggering condition associated with the deactivated cell has been satisfied. The communications manager 920 may be configured as or otherwise support a means for receiving, from the network entity and in response to the SRS, second control signaling indicating a timing advance associated with an uplink transmission to the deactivated cell.

By including or configuring the communications manager 920 in accordance with examples as described herein, the device 905 may support techniques for improved communication reliability, reduced latency, and improved coordination between devices, longer battery life, improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of uplink synchronization refinement for inter-cell mobility as described herein, or the processor 940 and the memory 930 may be otherwise configured to perform or support such operations.

Figure 10:
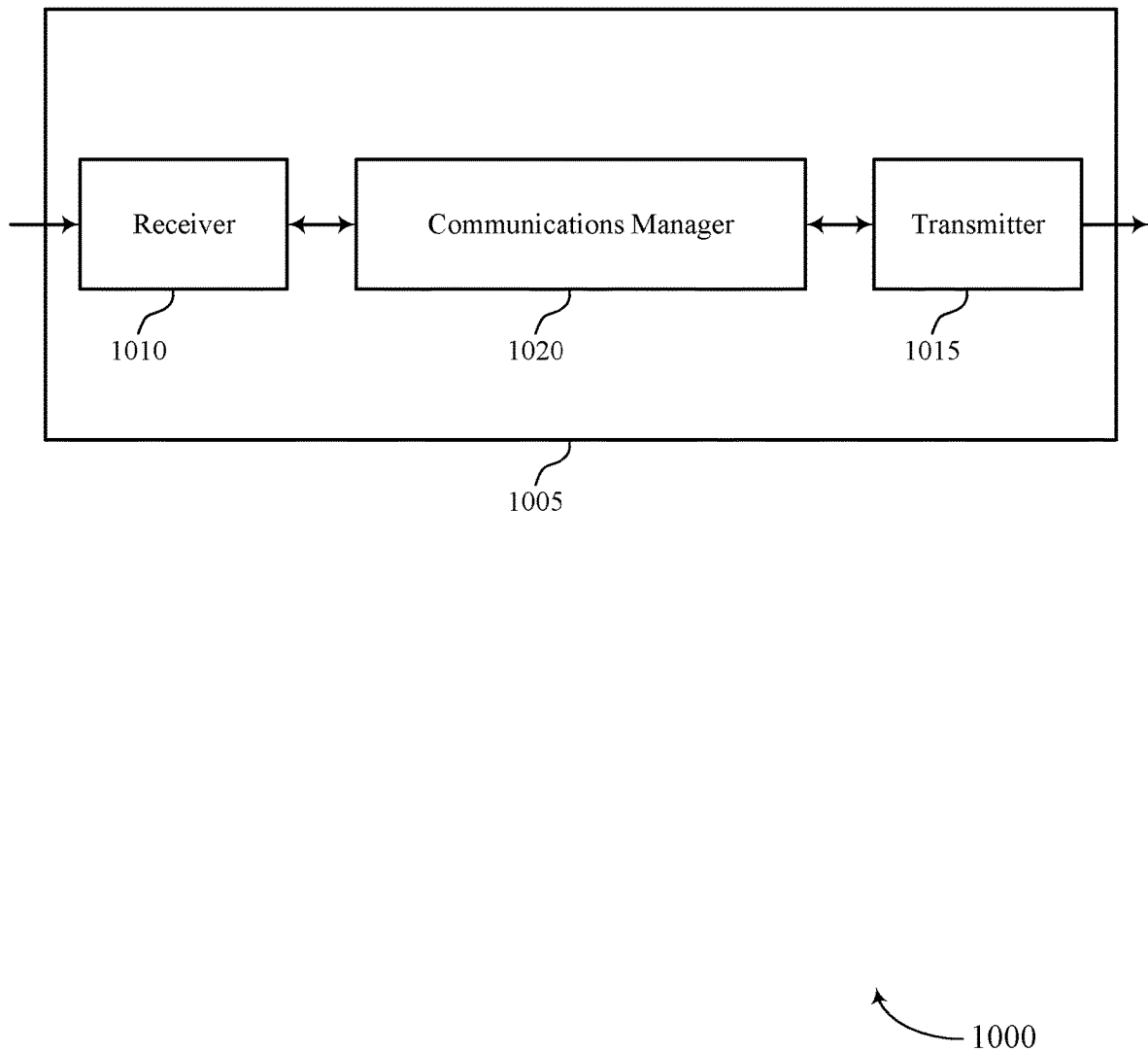
FIGS. 10 and 11 show block diagrams of devices that support uplink synchronization refinement for inter-cell mobility in accordance with one or more aspects of the present disclosure.

FIG. 10 shows a block diagram 1000 of a device 1005 that supports uplink synchronization refinement for inter-cell mobility in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of uplink synchronization refinement for inter-cell mobility as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting, to a UE, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The communications manager 1020 may be configured as or otherwise support a means for receiving, from the UE, the SRS via the deactivated cell. The communications manager 1020 may be configured as or otherwise support a means for transmitting, to the UE based and in response to the SRS, second control signaling indicating a timing advance associated with an uplink transmission to the deactivated cell.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
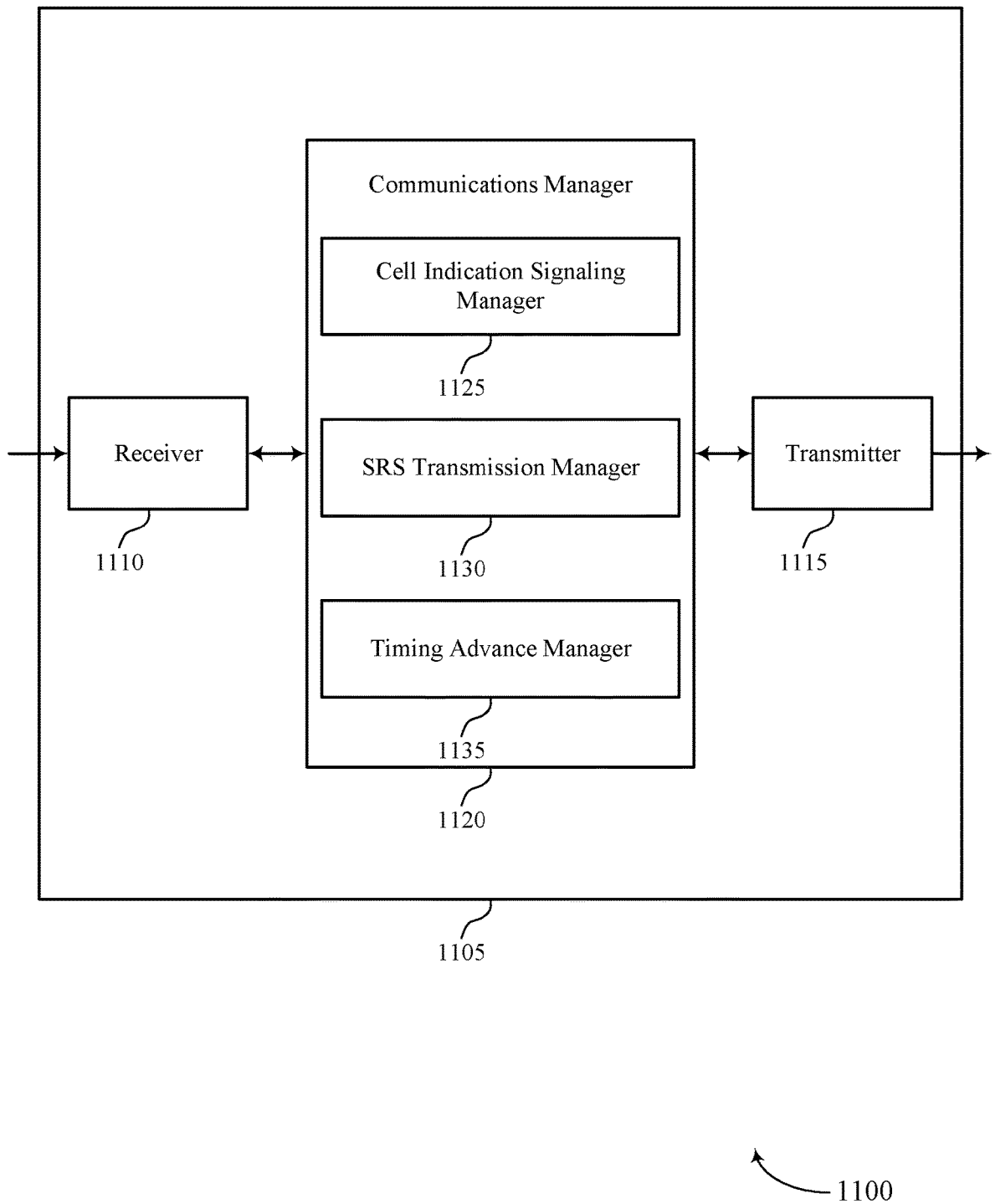

FIG. 11 shows a block diagram 1100 of a device 1105 that supports uplink synchronization refinement for inter-cell mobility in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of uplink synchronization refinement for inter-cell mobility as described herein. For example, the communications manager 1120 may include a cell indication signaling manager 1125, an SRS transmission manager 1130, a timing advance manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The cell indication signaling manager 1125 may be configured as or otherwise support a means for transmitting, to a UE, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The SRS transmission manager 1130 may be configured as or otherwise support a means for receiving, from the UE, the SRS via the deactivated cell. The timing advance manager 1135 may be configured as or otherwise support a means for transmitting, to the UE based and in response to the SRS, second control signaling indicating a timing advance associated with an uplink transmission to the deactivated cell.

Figure 12:
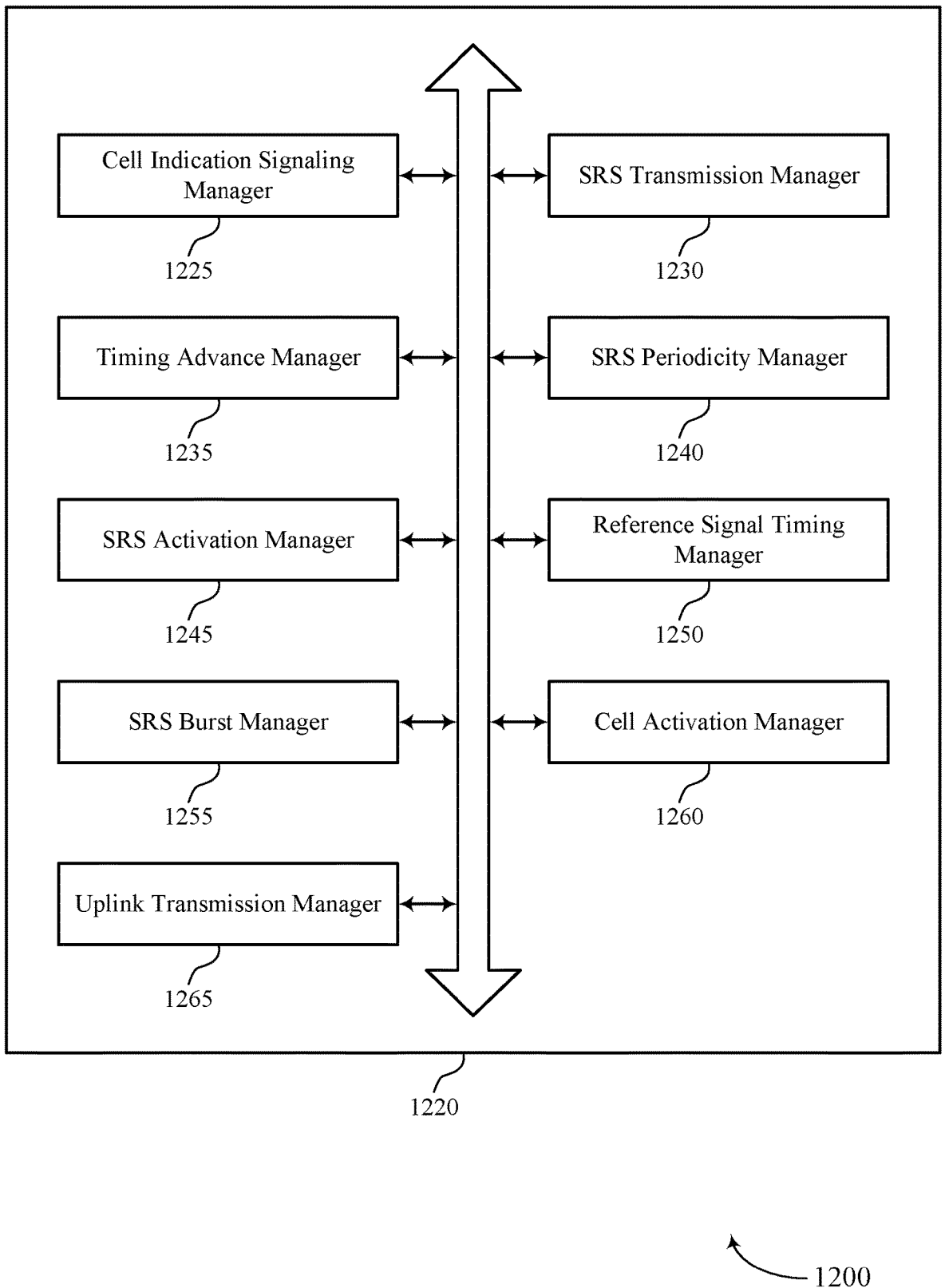
FIG. 12 shows a block diagram of a communications manager that supports uplink synchronization refinement for inter-cell mobility in accordance with one or more aspects of the present disclosure.

FIG. 12 shows a block diagram 1200 of a communications manager 1220 that supports uplink synchronization refinement for inter-cell mobility in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of uplink synchronization refinement for inter-cell mobility as described herein. For example, the communications manager 1220 may include a cell indication signaling manager 1225, an SRS transmission manager 1230, a timing advance manager 1235, an SRS periodicity manager 1240, an SRS activation manager 1245, a reference signal timing manager 1250, an SRS burst manager 1255, a cell activation manager 1260, an uplink transmission manager 1265, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The cell indication signaling manager 1225 may be configured as or otherwise support a means for transmitting, to a UE, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The SRS transmission manager 1230 may be configured as or otherwise support a means for receiving, from the UE, the SRS via the deactivated cell. The timing advance manager 1235 may be configured as or otherwise support a means for transmitting, to the UE based and in response to the SRS, second control signaling indicating a timing advance associated with an uplink transmission to the deactivated cell.

In some examples, to support transmitting the first control signaling, the SRS periodicity manager 1240 may be configured as or otherwise support a means for transmitting an indication of a periodicity associated with the transmission of the SRS, where the triggering condition corresponds to a transmission occasion associated with the periodicity.

In some examples, the cell activation manager 1260 may be configured as or otherwise support a means for transmitting, to the UE, third control signaling activating the deactivated cell. In some examples, the uplink transmission manager 1265 may be configured as or otherwise support a means for receiving, from the UE via the deactivated cell and in response to the third control signaling, the uplink transmission in accordance with the timing advance.

In some examples, the cell activation manager 1260 may be configured as or otherwise support a means for transmitting, to the UE, third control signaling activating a second deactivated cell of the set of cells, the second deactivated cell associated with a same timing advance group as the deactivated cell. In some examples, the uplink transmission manager 1265 may be configured as or otherwise support a means for receiving, from the UE via the second deactivated cell and in response to the third control signaling, the uplink transmission in accordance with the timing advance.

In some examples, the SRS activation manager 1245 may be configured as or otherwise support a means for transmitting, to the UE, third control signaling indicating to transmit the SRS, where the triggering condition includes reception of the third control signaling.

In some examples, to support transmitting the third control signaling, the cell activation manager 1260 may be configured as or otherwise support a means for transmitting an indication of a cell activation command for the deactivated cell.

In some examples, the uplink transmission manager 1265 may be configured as or otherwise support a means for receiving, from the UE via the deactivated cell, the uplink transmission in accordance with the timing advance.

In some examples, to support transmitting the third control signaling, the SRS transmission manager 1230 may be configured as or otherwise support a means for transmitting an indication of a second timing advance to apply to transmission of the SRS.

In some examples, the reference signal timing manager 1250 may be configured as or otherwise support a means for transmitting, to the UE via the deactivated cell, a first downlink signal. In some examples, the reference signal timing manager 1250 may be configured as or otherwise support a means for transmitting, to the UE via a reference cell of the set of cells, a second downlink signal, where the triggering condition includes a timing difference change between a timing difference between a reception of the first downlink signal at the UE and a reception of the second downlink signal at the UE and a prior timing difference exceeding a threshold.

In some examples, the SRS burst manager 1255 may be configured as or otherwise support a means for receiving, from the UE via the deactivated cell, a set of multiple SRSs via a set of multiple communication resources, the set of multiple SRSs including the SRS and the set of multiple communication resources including the communication resource.

In some examples, to support transmitting the second control signaling, the timing advance manager 1235 may be configured as or otherwise support a means for transmitting the second control signaling via one of a MAC-CE or a downlink control information message.

In some examples, to support transmitting the first control signaling, the cell indication signaling manager 1225 may be configured as or otherwise support a means for transmitting the first control signaling via one of a MAC-CE or a downlink control information message, the first control signaling superseding a prior indication of the set of cells.

In some examples, the cell indication signaling manager 1225 may be configured as or otherwise support a means for transmitting, to the UE, third control signaling indicating a set of multiple communication resources including the communication resource, where transmitting the first control signaling includes transmitting one of a MAC-CE or a downlink control information message indicating the communication resource of the set of multiple communication resources.

Figure 13:
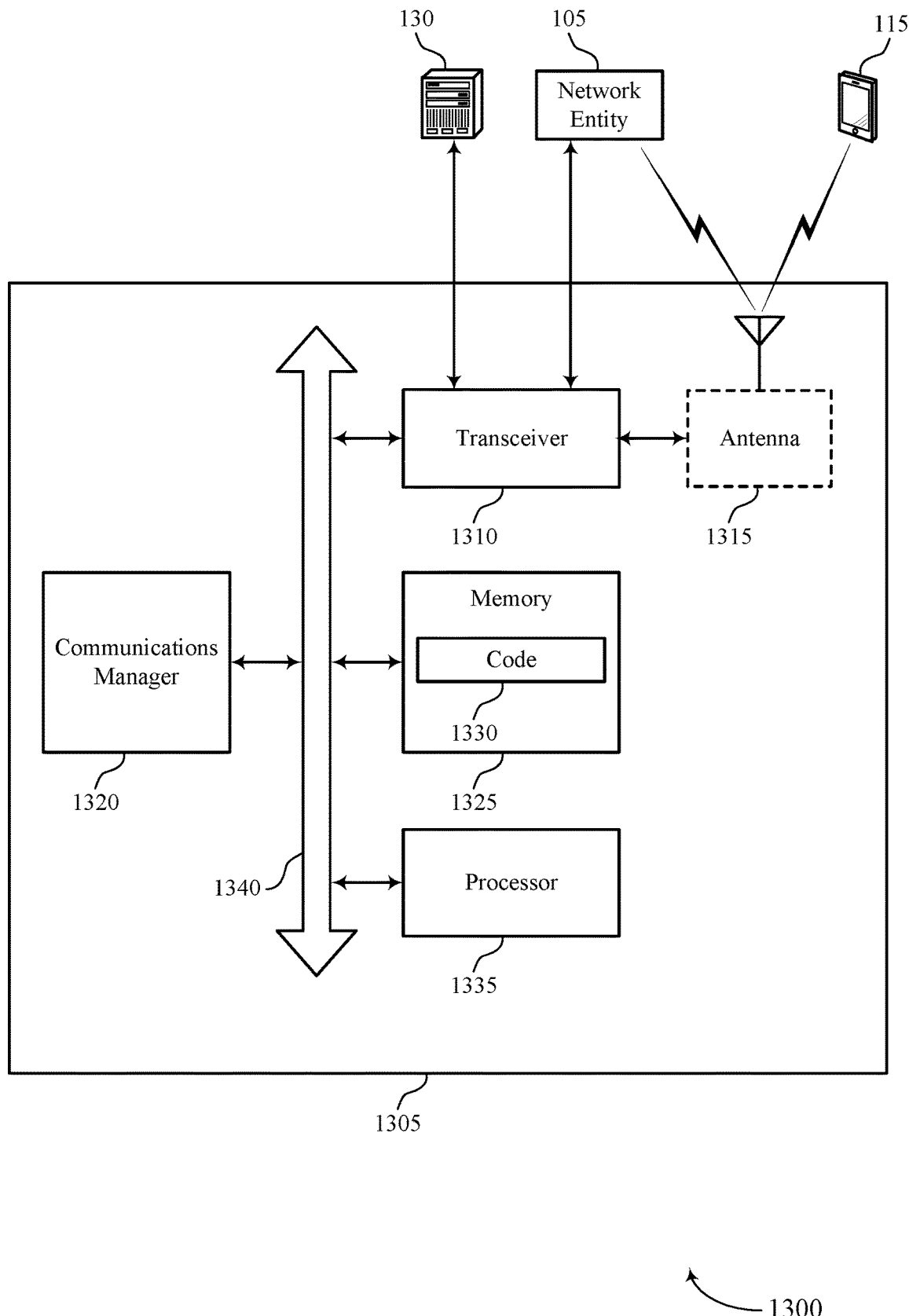
FIG. 13 shows a diagram of a system including a device that supports uplink synchronization refinement for inter-cell mobility in accordance with one or more aspects of the present disclosure.

FIG. 13 shows a diagram of a system 1300 including a device 1305 that supports uplink synchronization refinement for inter-cell mobility in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting uplink synchronization refinement for inter-cell mobility). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting, to a UE, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The communications manager 1320 may be configured as or otherwise support a means for receiving, from the UE, the SRS via the deactivated cell. The communications manager 1320 may be configured as or otherwise support a means for transmitting, to the UE based and in response to the SRS, second control signaling indicating a timing advance associated with an uplink transmission to the deactivated cell.

By including or configuring the communications manager 1320 in accordance with examples as described herein, the device 1305 may support techniques for improved communication reliability, reduced latency, and improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. For example, the communications manager 1320 may be configured to receive or transmit messages or other signaling as described herein via the transceiver 1310. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of uplink synchronization refinement for inter-cell mobility as described herein, or the processor 1335 and the memory 1325 may be otherwise configured to perform or support such operations.

Figure 14:
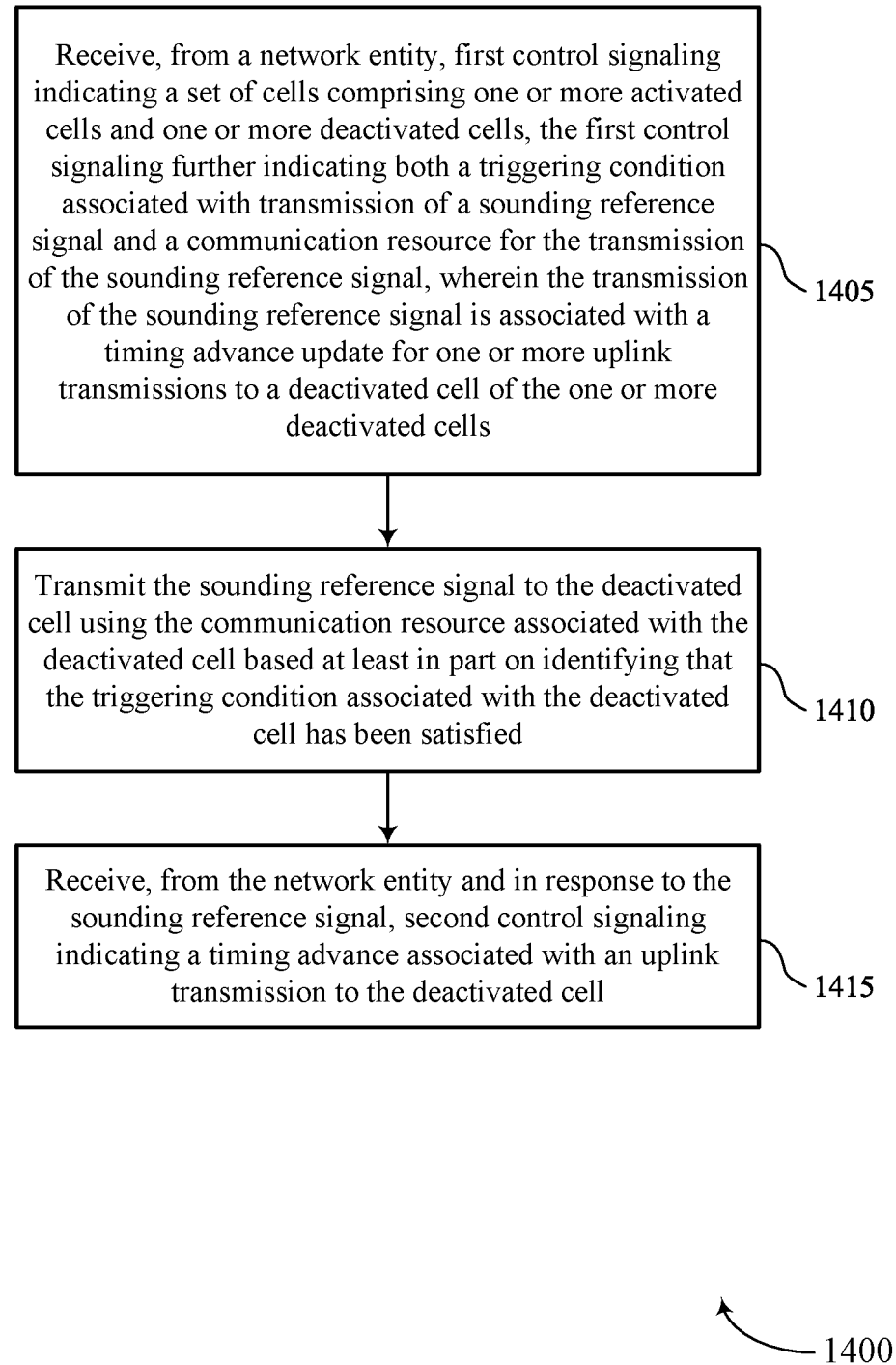
FIGS. 14 through 17 show flowcharts illustrating methods that support uplink synchronization refinement for inter-cell mobility in accordance with one or more aspects of the present disclosure.

FIG. 14 shows a flowchart illustrating a method 1400 that supports uplink synchronization refinement for inter-cell mobility in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The operations of 1405 may be performed in accordance with examples as disclosed herein. In some examples, aspects of the operations of 1405 may be performed by a cell indication signaling manager 825 as described with reference to FIG. 8. Additionally, or alternatively, means for performing 1405 may, but not necessarily, include, for example, antenna 925, transceiver 915, communications manager 920, memory 930 (including code 935), processor 940 and/or bus 945.

At 1410, the method may include transmitting the SRS to the deactivated cell using the communication resource associated with the deactivated cell based on identifying that the triggering condition associated with the deactivated cell has been satisfied. The operations of 1410 may be performed in accordance with examples as disclosed herein. In some examples, aspects of the operations of 1410 may be performed by an SRS transmission manager 830 as described with reference to FIG. 8. Additionally, or alternatively, means for performing 1410 may, but not necessarily, include, for example, antenna 925, transceiver 915, communications manager 920, memory 930 (including code 935), processor 940 and/or bus 945.

At 1415, the method may include receiving, from the network entity and in response to the SRS, second control signaling indicating a timing advance associated with an uplink transmission to the deactivated cell. The operations of 1415 may be performed in accordance with examples as disclosed herein. In some examples, aspects of the operations of 1415 may be performed by a timing advance manager 835 as described with reference to FIG. 8. Additionally, or alternatively, means for performing 1415 may, but not necessarily, include, for example, antenna 925, transceiver 915, communications manager 920, memory 930 (including code 935), processor 940 and/or bus 945.

Figure 15:
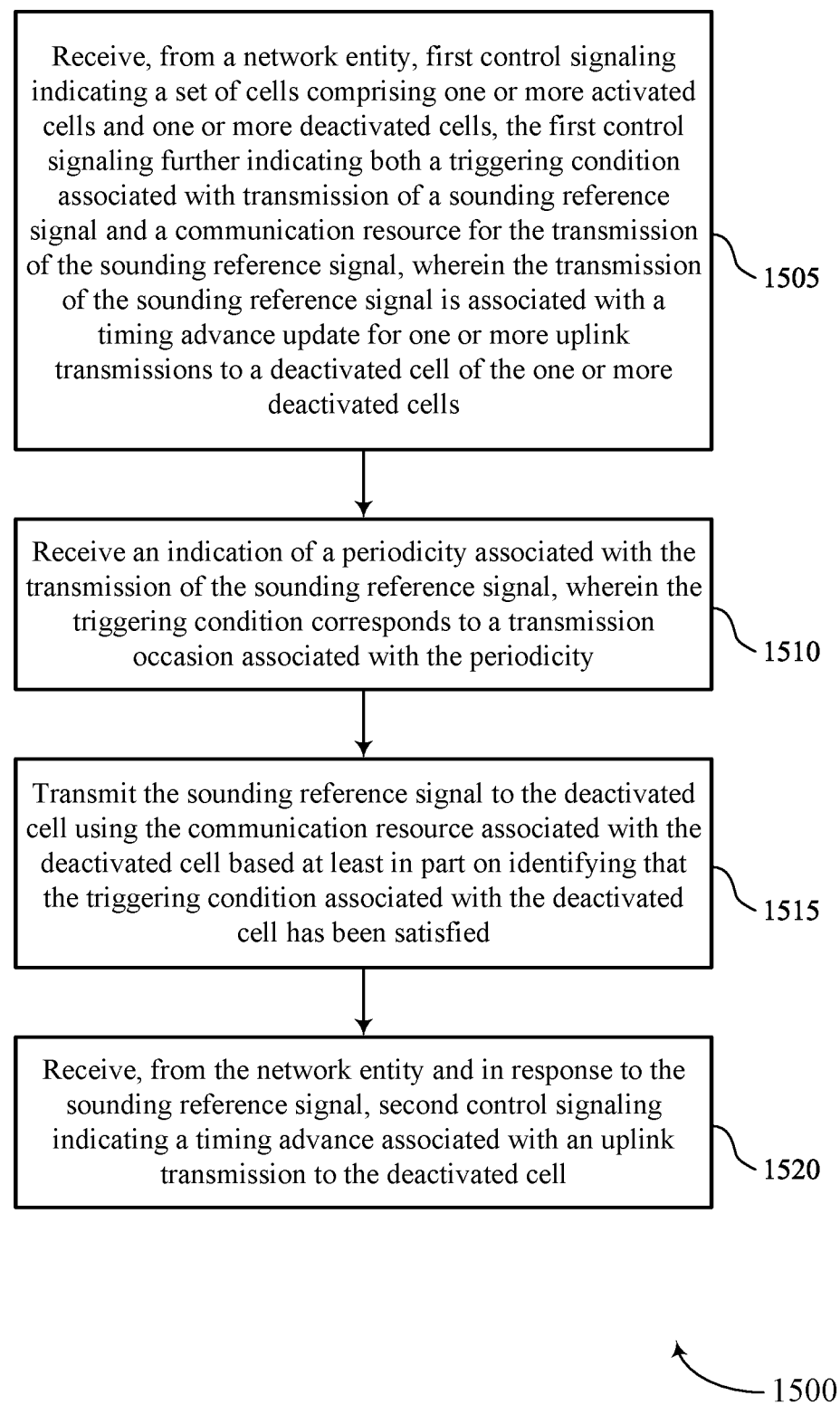

FIG. 15 shows a flowchart illustrating a method 1500 that supports uplink synchronization refinement for inter-cell mobility in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The operations of 1505 may be performed in accordance with examples as disclosed herein. In some examples, aspects of the operations of 1505 may be performed by a cell indication signaling manager 825 as described with reference to FIG. 8. Additionally, or alternatively, means for performing 1505 may, but not necessarily, include, for example, antenna 925, transceiver 915, communications manager 920, memory 930 (including code 935), processor 940 and/or bus 945.

At 1510, the method may include receiving an indication of a periodicity associated with the transmission of the SRS, where the triggering condition corresponds to a transmission occasion associated with the periodicity. The operations of 1510 may be performed in accordance with examples as disclosed herein. In some examples, aspects of the operations of 1510 may be performed by an SRS periodicity manager 840 as described with reference to FIG. 8. Additionally, or alternatively, means for performing 1510 may, but not necessarily, include, for example, antenna 925, transceiver 915, communications manager 920, memory 930 (including code 935), processor 940 and/or bus 945.

At 1515, the method may include transmitting the SRS to the deactivated cell using the communication resource associated with the deactivated cell based on identifying that the triggering condition associated with the deactivated cell has been satisfied. The operations of 1515 may be performed in accordance with examples as disclosed herein. In some examples, aspects of the operations of 1515 may be performed by an SRS transmission manager 830 as described with reference to FIG. 8. Additionally, or alternatively, means for performing 1515 may, but not necessarily, include, for example, antenna 925, transceiver 915, communications manager 920, memory 930 (including code 935), processor 940 and/or bus 945.

At 1520, the method may include receiving, from the network entity and in response to the SRS, second control signaling indicating a timing advance associated with an uplink transmission to the deactivated cell. The operations of 1520 may be performed in accordance with examples as disclosed herein. In some examples, aspects of the operations of 1520 may be performed by a timing advance manager 835 as described with reference to FIG. 8. Additionally, or alternatively, means for performing 1520 may, but not necessarily, include, for example, antenna 925, transceiver 915, communications manager 920, memory 930 (including code 935), processor 940 and/or bus 945.

Figure 16:
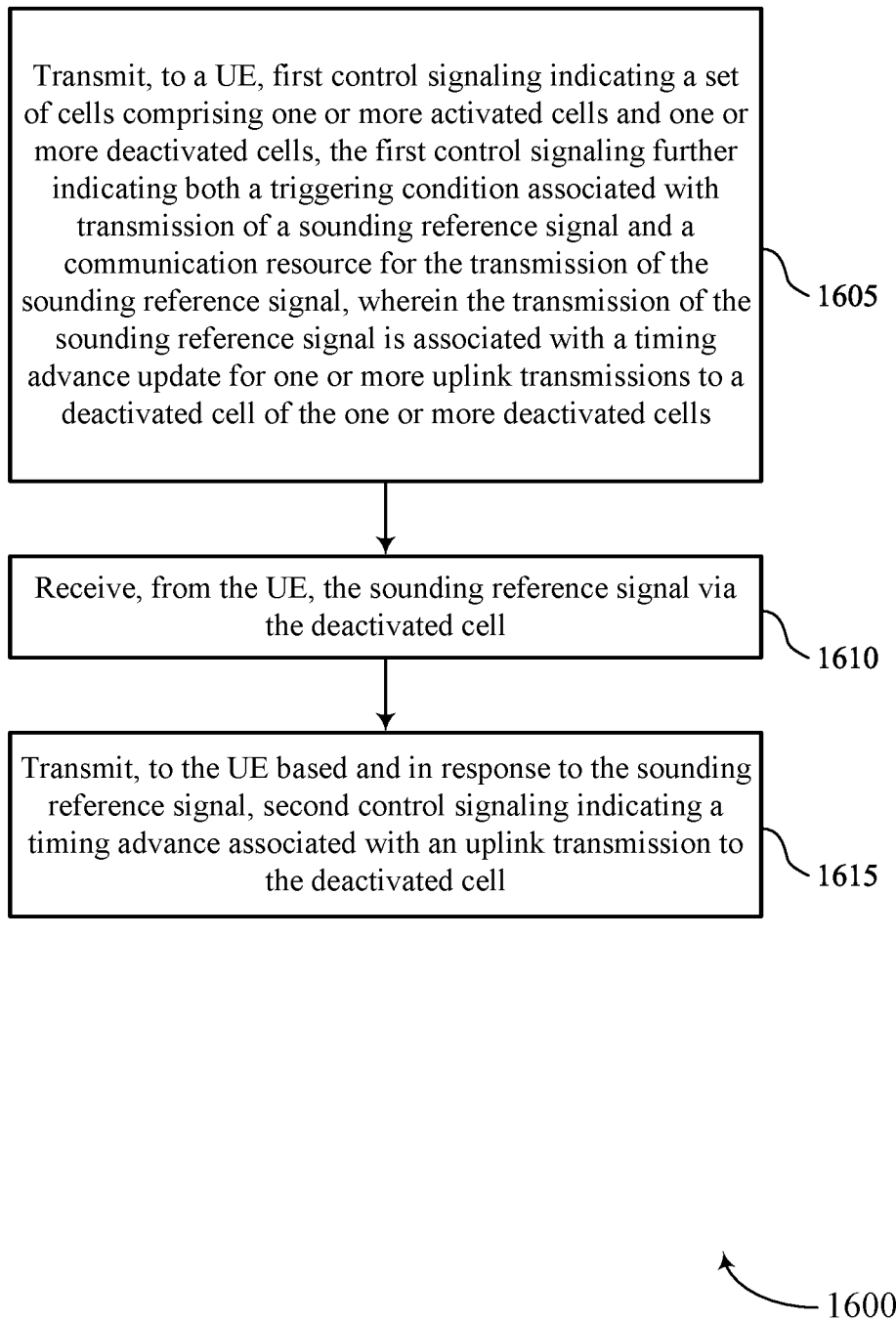

FIG. 16 shows a flowchart illustrating a method 1600 that supports uplink synchronization refinement for inter-cell mobility in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The operations of 1605 may be performed in accordance with examples as disclosed herein. In some examples, aspects of the operations of 1605 may be performed by a cell indication signaling manager 1225 as described with reference to FIG. 12. Additionally, or alternatively, means for performing 1605 may, but not necessarily, include, for example, antenna 1315, transceiver 1310, communications manager 1320, memory 1325 (including code 1330), processor 1335 and/or bus 1340.

At 1610, the method may include receiving, from the UE, the SRS via the deactivated cell. The operations of 1610 may be performed in accordance with examples as disclosed herein. In some examples, aspects of the operations of 1610 may be performed by an SRS transmission manager 1230 as described with reference to FIG. 12. Additionally, or alternatively, means for performing 1610 may, but not necessarily, include, for example, antenna 1315, transceiver 1310, communications manager 1320, memory 1325 (including code 1330), processor 1335 and/or bus 1340.

At 1615, the method may include transmitting, to the UE based and in response to the SRS, second control signaling indicating a timing advance associated with an uplink transmission to the deactivated cell. The operations of 1615 may be performed in accordance with examples as disclosed herein. In some examples, aspects of the operations of 1615 may be performed by a timing advance manager 1235 as described with reference to FIG. 12. Additionally, or alternatively, means for performing 1615 may, but not necessarily, include, for example, antenna 1315, transceiver 1310, communications manager 1320, memory 1325 (including code 1330), processor 1335 and/or bus 1340.

Figure 17:
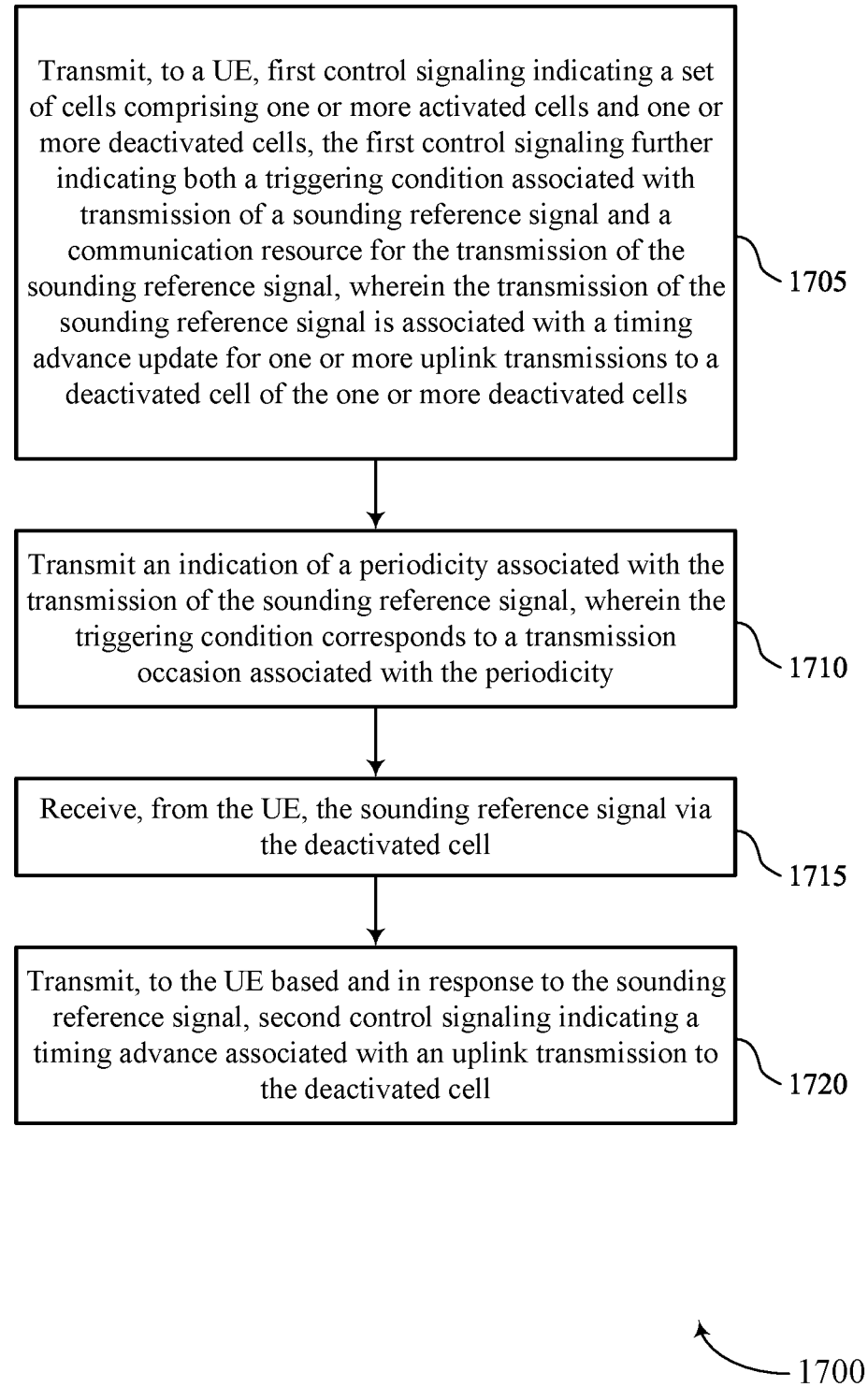

FIG. 17 shows a flowchart illustrating a method 1700 that supports uplink synchronization refinement for inter-cell mobility in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, first control signaling indicating a set of cells including one or more activated cells and one or more deactivated cells, the first control signaling further indicating both a triggering condition associated with transmission of an SRS and a communication resource for the transmission of the SRS, where the transmission of the SRS is associated with a timing advance update for one or more uplink transmissions to a deactivated cell of the one or more deactivated cells. The operations of 1705 may be performed in accordance with examples as disclosed herein. In some examples, aspects of the operations of 1705 may be performed by a cell indication signaling manager 1225 as described with reference to FIG. 12. Additionally, or alternatively, means for performing 1705 may, but not necessarily, include, for example, antenna 1315, transceiver 1310, communications manager 1320, memory 1325 (including code 1330), processor 1335 and/or bus 1340.

At 1710, the method may include transmitting an indication of a periodicity associated with the transmission of the SRS, where the triggering condition corresponds to a transmission occasion associated with the periodicity. The operations of 1710 may be performed in accordance with examples as disclosed herein. In some examples, aspects of the operations of 1710 may be performed by an SRS periodicity manager 1240 as described with reference to FIG. 12. Additionally, or alternatively, means for performing 1710 may, but not necessarily, include, for example, antenna 1315, transceiver 1310, communications manager 1320, memory 1325 (including code 1330), processor 1335 and/or bus 1340.

At 1715, the method may include receiving, from the UE, the SRS via the deactivated cell. The operations of 1715 may be performed in accordance with examples as disclosed herein. In some examples, aspects of the operations of 1715 may be performed by an SRS transmission manager 1230 as described with reference to FIG. 12. Additionally, or alternatively, means for performing 1715 may, but not necessarily, include, for example, antenna 1315, transceiver 1310, communications manager 1320, memory 1325 (including code 1330), processor 1335 and/or bus 1340.

At 1720, the method may include transmitting, to the UE based and in response to the SRS, second control signaling indicating a timing advance associated with an uplink transmission to the deactivated cell. The operations of 1720 may be performed in accordance with examples as disclosed herein. In some examples, aspects of the operations of 1720 may be performed by a timing advance manager 1235 as described with reference to FIG. 12. Additionally, or alternatively, means for performing 1720 may, but not necessarily, include, for example, antenna 1315, transceiver 1310, communications manager 1320, memory 1325 (including code 1330), processor 1335 and/or bus 1340.

The following provides an overview of aspects of the present disclosure:

Aspect 1: A method for wireless communications at a UE, comprising: receiving, from a network entity, first control signaling indicating a set of cells comprising one or more activated cells and one or more deactivated cells, the first control signaling further indicating both a triggering condition associated with transmission of a SRS and a communication resource for the transmission of the SRS, wherein the transmission of the SRS is associated with a timing advance update for one or more uplink transmissions to a deactivated cell of the one or more deactivated cells; transmitting the SRS to the deactivated cell using the communication resource associated with the deactivated cell based at least in part on identifying that the triggering condition associated with the deactivated cell has been satisfied; and receiving, from the network entity and in response to the SRS, second control signaling indicating a timing advance associated with an uplink transmission to the deactivated cell.

Aspect 2: The method of aspect 1, wherein receiving the first control signaling comprises: receiving an indication of a periodicity associated with the transmission of the SRS, wherein the triggering condition corresponds to a transmission occasion associated with the periodicity.

Aspect 3: The method of aspect 2, further comprising: receiving, from the network entity, third control signaling activating the deactivated cell; and transmitting, to the deactivated cell in response to the third control signaling, the uplink transmission in accordance with the timing advance.

Aspect 4: The method of any of aspects 2 through 3, further comprising: receiving, from the network entity, third control signaling activating a second deactivated cell of the set of cells, the second deactivated cell associated with a same timing advance group as the deactivated cell; and transmitting, to the second deactivated cell in response to the third control signaling, the uplink transmission in accordance with the timing advance.

Aspect 5: The method of any of aspects 1 through 4, further comprising: receiving, from the network entity, third control signaling indicating to transmit the SRS, wherein the triggering condition comprises reception of the third control signaling.

Aspect 6: The method of aspect 5, wherein receiving the third control signaling comprises: receiving an indication of a cell activation command for the deactivated cell.

Aspect 7: The method of aspect 6, further comprising: transmitting, to the deactivated cell, the uplink transmission in accordance with the timing advance.

Aspect 8: The method of any of aspects 5 through 7, wherein receiving the third control signaling comprises: receiving an indication of a second timing advance to apply to transmission of the SRS.

Aspect 9: The method of any of aspects 1 through 8, further comprising: receiving, from the deactivated cell, a first downlink signal; receiving, from a reference cell of the set of cells, a second downlink signal; and identifying a timing difference between reception of the first downlink signal and the second downlink signal, wherein the triggering condition comprises a timing difference change between the timing difference and a prior timing difference exceeding a threshold.

Aspect 10: The method of any of aspects 1 through 9, further comprising: transmitting a plurality of SRSs to the deactivated cell via a plurality of communication resources, the plurality of SRSs comprising the SRS and the plurality of communication resources comprising the communication resource.

Aspect 11: The method of any of aspects 1 through 10, wherein receiving the second control signaling comprises: receiving the second control signaling via one of a MAC-CE or a DCI message.

Aspect 12: The method of any of aspects 1 through 11, wherein receiving the first control signaling comprises: receiving the first control signaling via one of a MAC-CE or a DCI message, the first control signaling superseding a prior indication of the set of cells.

Aspect 13: The method of any of aspects 1 through 12, further comprising: receiving, from the network entity, third control signaling indicating a plurality of communication resources comprising the communication resource, wherein receiving the first control signaling comprises receiving one of a MAC-CE or a DCI message indicating the communication resource of the plurality of communication resources.

Aspect 14: A method for wireless communications at a network entity, comprising: transmitting, to a UE, first control signaling indicating a set of cells comprising one or more activated cells and one or more deactivated cells, the first control signaling further indicating both a triggering condition associated with transmission of a SRS and a communication resource for the transmission of the SRS, wherein the transmission of the SRS is associated with a timing advance update for one or more uplink transmissions to a deactivated cell of the one or more deactivated cells; receiving, from the UE, the SRS via the deactivated cell; and transmitting, to the UE based and in response to the SRS, second control signaling indicating a timing advance associated with an uplink transmission to the deactivated cell.

Aspect 15: The method of aspect 14, wherein transmitting the first control signaling comprises: transmitting an indication of a periodicity associated with the transmission of the SRS, wherein the triggering condition corresponds to a transmission occasion associated with the periodicity.

Aspect 16: The method of aspect 15, further comprising: transmitting, to the UE, third control signaling activating the deactivated cell; and receiving, from the UE via the deactivated cell and in response to the third control signaling, the uplink transmission in accordance with the timing advance.

Aspect 17: The method of any of aspects 15 through 16, further comprising: transmitting, to the UE, third control signaling activating a second deactivated cell of the set of cells, the second deactivated cell associated with a same timing advance group as the deactivated cell; and receiving, from the UE via the second deactivated cell and in response to the third control signaling, the uplink transmission in accordance with the timing advance.

Aspect 18: The method of any of aspects 14 through 17, further comprising: transmitting, to the UE, third control signaling indicating to transmit the SRS, wherein the triggering condition comprises reception of the third control signaling.

Aspect 19: The method of aspect 18, wherein transmitting the third control signaling comprises: transmitting an indication of a cell activation command for the deactivated cell.

Aspect 20: The method of aspect 19, further comprising: receiving, from the UE via the deactivated cell, the uplink transmission in accordance with the timing advance.

Aspect 21: The method of any of aspects 18 through 20, wherein transmitting the third control signaling comprises: transmitting an indication of a second timing advance to apply to transmission of the SRS.

Aspect 22: The method of any of aspects 14 through 21, further comprising: transmitting, to the UE via the deactivated cell, a first downlink signal; and transmitting, to the UE via a reference cell of the set of cells, a second downlink signal, wherein the triggering condition comprises a timing difference change between a timing difference between a reception of the first downlink signal at the UE and a reception of the second downlink signal at the UE and a prior timing difference exceeding a threshold.

Aspect 23: The method of any of aspects 14 through 22, further comprising: receiving, from the UE via the deactivated cell, a plurality of SRSs via a plurality of communication resources, the plurality of SRSs comprising the SRS and the plurality of communication resources comprising the communication resource.

Aspect 24: The method of any of aspects 14 through 23, wherein transmitting the second control signaling comprises: transmitting the second control signaling via one of a MAC-CE or a DCI message.

Aspect 25: The method of any of aspects 14 through 24, wherein transmitting the first control signaling comprises: transmitting the first control signaling via one of a MAC-CE or a DCI message, the first control signaling superseding a prior indication of the set of cells.

Aspect 26: The method of any of aspects 14 through 25, further comprising: transmitting, to the UE, third control signaling indicating a plurality of communication resources comprising the communication resource, wherein transmitting the first control signaling comprises transmitting one of a MAC-CE or a DCI message indicating the communication resource of the plurality of communication resources.

Aspect 27: An apparatus comprising a memory, transceiver, and at least one processor coupled with the memory and the transceiver, the at least one processor configured to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: An apparatus comprising a memory and at least one processor coupled with the memory, the at least one processor configured to perform a method of any of aspects 14 through 26.

Aspect 31: An apparatus for wireless communications at a network entity, comprising at least one means for performing a method of any of aspects 14 through 26.

Aspect 32: A non-transitory computer-readable medium storing code for wireless communications at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, first control signaling indicating a set of cells comprising one or more activated cells and one or more deactivated cells, the first control signaling further indicating both a triggering condition associated with transmission of a sounding reference signal and a communication resource for the transmission of the sounding reference signal, wherein the transmission of the sounding reference signal is associated with a timing advance update for one or more uplink transmissions to a deactivated cell of the one or more deactivated cells;
   transmitting the sounding reference signal to the deactivated cell using the communication resource associated with the deactivated cell based at least in part on identifying that the triggering condition associated with the deactivated cell has been satisfied; and
   receiving, from the network entity and in response to the sounding reference signal, second control signaling indicating a first timing advance associated with an uplink transmission to the deactivated cell.

2. The method of claim 1, wherein receiving the first control signaling comprises:
   receiving an indication of a periodicity associated with the transmission of the sounding reference signal, wherein the triggering condition corresponds to a transmission occasion associated with the periodicity.

3. The method of claim 2, further comprising:
   receiving, from the network entity, third control signaling activating the deactivated cell; and
   transmitting, to the deactivated cell in response to the third control signaling, the uplink transmission in accordance with the first timing advance.

4. The method of claim 2, further comprising:
   receiving, from the network entity, third control signaling activating a second deactivated cell of the set of cells, the second deactivated cell associated with a same timing advance group as the deactivated cell; and
   transmitting, to the second deactivated cell in response to the third control signaling, the uplink transmission in accordance with the first timing advance.

5. The method of claim 1, further comprising:
   receiving, from the network entity, third control signaling indicating to transmit the sounding reference signal, wherein the triggering condition comprises reception of the third control signaling.

6. The method of claim 5, wherein receiving the third control signaling comprises:
   receiving an indication of a cell activation command for the deactivated cell.

7. The method of claim 6, further comprising:
   transmitting, to the deactivated cell, the uplink transmission in accordance with the first timing advance.

8. The method of claim 5, wherein receiving the third control signaling comprises:
   receiving an indication of a second timing advance to apply to transmission of the sounding reference signal.

9. The method of claim 1, further comprising:
   receiving, from the deactivated cell, a first downlink signal;
   receiving, from a reference cell of the set of cells, a second downlink signal; and
   identifying a timing difference between reception of the first downlink signal and the second downlink signal, wherein the triggering condition comprises a timing difference change between the timing difference and a prior timing difference exceeding a threshold.

10. The method of claim 1, further comprising:
    transmitting a plurality of sounding reference signals to the deactivated cell via a plurality of communication resources, the plurality of sounding reference signals comprising the sounding reference signal and the plurality of communication resources comprising the communication resource.

11. The method of claim 1, wherein receiving the second control signaling comprises:
    receiving the second control signaling via one of a medium access control (MAC) control element or a downlink control information message.

12. The method of claim 1, wherein receiving the first control signaling comprises:

receiving the first control signaling via one of a medium access control (MAC) control element or a downlink control information message, the first control signaling superseding a prior indication of the set of cells.

13. The method of claim 1, further comprising:
receiving, from the network entity, third control signaling indicating a plurality of communication resources comprising the communication resource, wherein receiving the first control signaling comprises receiving one of a medium access control (MAC) control element or a downlink control information message indicating the communication resource of the plurality of communication resources.

14. A method for wireless communications at a network entity, comprising:
transmitting, to a user equipment (UE), first control signaling indicating a set of cells comprising one or more activated cells and one or more deactivated cells, the first control signaling further indicating both a triggering condition associated with transmission of a sounding reference signal and a communication resource for the transmission of the sounding reference signal, wherein the transmission of the sounding reference signal is associated with a timing advance update for one or more uplink transmissions to a deactivated cell of the one or more deactivated cells;
receiving, from the UE, the sounding reference signal via the deactivated cell; and
transmitting, to the UE based and in response to the sounding reference signal, second control signaling indicating a first timing advance associated with an uplink transmission to the deactivated cell.

15. The method of claim 14, wherein transmitting the first control signaling comprises:
transmitting an indication of a periodicity associated with the transmission of the sounding reference signal, wherein the triggering condition corresponds to a transmission occasion associated with the periodicity.

16. The method of claim 15, further comprising:
transmitting, to the UE, third control signaling activating the deactivated cell; and
receiving, from the UE via the deactivated cell and in response to the third control signaling, the uplink transmission in accordance with the first timing advance.

17. The method of claim 15, further comprising:
transmitting, to the UE, third control signaling activating a second deactivated cell of the set of cells, the second deactivated cell associated with a same timing advance group as the deactivated cell; and
receiving, from the UE via the second deactivated cell and in response to the third control signaling, the uplink transmission in accordance with the first timing advance.

18. The method of claim 14, further comprising:
transmitting, to the UE, third control signaling indicating to transmit the sounding reference signal, wherein the triggering condition comprises reception of the third control signaling, wherein the third control signaling comprises a cell activation command for the deactivated cell; and
receiving, from the UE via the deactivated cell, the uplink transmission in accordance with the first timing advance.

19. The method of claim 18, wherein transmitting the third control signaling comprises:

transmitting an indication of a second timing advance to apply to transmission of the sounding reference signal.

20. The method of claim 14, further comprising:
transmitting, to the UE via the deactivated cell, a first downlink signal; and
transmitting, to the UE via a reference cell of the set of cells, a second downlink signal, wherein the triggering condition comprises a timing difference change between a timing difference between a reception of the first downlink signal at the UE and a reception of the second downlink signal at the UE and a prior timing difference exceeding a threshold.

21. The method of claim 14, further comprising:
receiving, from the UE via the deactivated cell, a plurality of sounding reference signals via a plurality of communication resources, the plurality of sounding reference signals comprising the sounding reference signal and the plurality of communication resources comprising the communication resource.

22. The method of claim 14, wherein transmitting the second control signaling comprises:
transmitting the second control signaling via one of a medium access control (MAC) control element or a downlink control information message.

23. The method of claim 14, wherein transmitting the first control signaling comprises:
transmitting the first control signaling via one of a medium access control (MAC) control element or a downlink control information message, the first control signaling superseding a prior indication of the set of cells.

24. The method of claim 14, further comprising:
transmitting, to the UE, third control signaling indicating a plurality of communication resources comprising the communication resource, wherein transmitting the first control signaling comprises transmitting one of a medium access control (MAC) control element or a downlink control information message indicating the communication resource of the plurality of communication resources.

25. An apparatus for wireless communications, comprising:
memory;
a transceiver; and
at least one processor of a user equipment (UE), the at least one processor coupled with the memory and the transceiver, and the at least one processor configured to:
receive, via the transceiver and from a network entity, first control signaling indicating a set of cells comprising one or more activated cells and one or more deactivated cells, the first control signaling further indicating both a triggering condition associated with transmission of a sounding reference signal and a communication resource for the transmission of the sounding reference signal, wherein the transmission of the sounding reference signal is associated with a timing advance update for one or more uplink transmissions to a deactivated cell of the one or more deactivated cells;
transmit, via the transceiver, the sounding reference signal to the deactivated cell using the communication resource associated with the deactivated cell based at least in part on identifying that the triggering condition associated with the deactivated cell has been satisfied; and receive, via the transceiver and from the network entity and in response to the sounding reference signal, second control signaling indicating a first timing advance associated with an uplink transmission to the deactivated cell.

26. The apparatus of claim 25, wherein to receive the first control signaling, the at least one processor is further configured to:
receive, via the transceiver, an indication of a periodicity associated with the transmission of the sounding reference signal, wherein the triggering condition corresponds to a transmission occasion associated with the periodicity.

27. The apparatus of claim 25, the at least one processor further configured to:
receive, via the transceiver and from the network entity, third control signaling indicating to transmit the sounding reference signal, wherein the triggering condition comprises reception of the third control signaling.

28. The apparatus of claim 27, wherein to receive the third control signaling, the at least one processor is further configured to:
receive, via the transceiver, an indication of a cell activation command for the deactivated cell.

29. The apparatus of claim 25, the at least one processor further configured to:
receive, from the deactivated cell, a first downlink signal;
receive, from a reference cell of the set of cells, a second downlink signal; and
identify a timing difference between reception of the first downlink signal and the second downlink signal, wherein the triggering condition comprises a timing difference change between the timing difference and a prior timing difference exceeding a threshold.

30. An apparatus for wireless communications, comprising:
memory; and
at least one processor of a network entity, the at least one processor coupled with the memory, and the at least one processor configured to:
transmit, to a user equipment (UE), first control signaling indicating a set of cells comprising one or more activated cells and one or more deactivated cells, the first control signaling further indicating both a triggering condition associated with transmission of a sounding reference signal and a communication resource for the transmission of the sounding reference signal, wherein the transmission of the sounding reference signal is associated with a timing advance update for one or more uplink transmissions to a deactivated cell of the one or more deactivated cells;
receive, from the UE, the sounding reference signal via the deactivated cell; and
transmit, to the UE based and in response to the sounding reference signal, second control signaling indicating a first timing advance associated with an uplink transmission to the deactivated cell.

* * * * *